(12) United States Patent
Takenaka et al.

(10) Patent No.: US 10,696,326 B2
(45) Date of Patent: Jun. 30, 2020

(54) VEHICLE

(71) Applicant: HONDA MOTOR CO., LTD., Tokyo (JP)

(72) Inventors: Toru Takenaka, Saitama (JP); Hiroshi Gomi, Saitama (JP); Yoshinao Sodeyama, Saitama (JP); Kazushi Akimoto, Saitama (JP); Osamu Kikuchi, Saitama (JP); Takashi Kudo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 15/683,302

(22) Filed: Aug. 22, 2017

(65) Prior Publication Data
US 2018/0057050 A1    Mar. 1, 2018

(30) Foreign Application Priority Data

Aug. 30, 2016  (JP) ................... 2016-168466

(51) Int. Cl.
*B62D 9/04* (2006.01)
*B62D 9/02* (2006.01)
(Continued)

(52) U.S. Cl.
CPC ............... *B62D 9/02* (2013.01); *B60G 9/04* (2013.01); *B60G 17/0162* (2013.01);
(Continued)

(58) Field of Classification Search
CPC . B62D 9/02; B62D 37/06; B62D 5/30; B62D 61/02; B62K 5/027; B62K 5/05;
(Continued)

(56) References Cited

U.S. PATENT DOCUMENTS 8,020,878 B2 * 9/2011 Hara ................. B60G 13/08
                                              280/124.103
8,128,110 B2 * 3/2012 Sacli ................. B60G 21/05
                                              280/124.1
(Continued)

FOREIGN PATENT DOCUMENTS

JP      2000-219146 A    8/2000
JP      2010-247631 A    11/2010
(Continued)

OTHER PUBLICATIONS

Translation of JP 2010-247631 A . Accessed on Jan. 3, 2020 at IP.com (Year: 2010).*

(Continued)

*Primary Examiner* — Paul N Dickson
*Assistant Examiner* — Hilary L Johns
(74) *Attorney, Agent, or Firm* — Rankin, Hill & Clark LLP

(57) ABSTRACT

The steering angles of front wheels $3f$ and rear wheels $3r$ of a vehicle 1 can be respectively controlled by a front wheel steering angle control actuator 35 and a rear wheel steering angle control actuator 44. If a steering wheel 20 is operated in a turning direction of the vehicle 1 while the vehicle 1 is traveling in a straight line, then a controller 60 changes the steering angle of the front wheels $3f$ to approach to a steering angle specified on the basis of an operation amount after the steering wheel 20 is operated, and also controls the front wheel steering angle control actuator 35 and the rear wheel steering angle control actuator 44 to change the steering angles of the rear wheels $3r$ to the opposite direction of the turning direction of the vehicle 1 immediately after the steering wheel 20 is operated.

10 Claims, 22 Drawing Sheets

(51) Int. Cl.
*B60G 9/04* (2006.01)
*B60G 17/016* (2006.01)
*B62D 6/00* (2006.01)
*B62D 15/02* (2006.01)
*B62D 33/067* (2006.01)

(52) U.S. Cl.
CPC .......... *B62D 6/002* (2013.01); *B62D 15/021* (2013.01); *B62D 33/067* (2013.01); *B60G 2200/44* (2013.01); *B60G 2300/45* (2013.01); *B60G 2400/0511* (2013.01); *B60G 2400/204* (2013.01); *B60G 2400/34* (2013.01); *B60G 2400/41* (2013.01)

(58) Field of Classification Search
CPC .......... B62K 5/08; B62K 5/10; B62K 11/007; B62K 21/00; B60R 21/213; B60R 21/232; B60R 21/23138
USPC ........................................ 280/730.2
See application file for complete search history.

(56) References Cited

U.S. PATENT DOCUMENTS

| | | | | |
|---|---|---|---|---|
| 8,141,890 B2* | 3/2012 | Hughes | ................ | B60G 21/007 |
| | | | | 280/124.103 |
| 8,762,003 B2* | 6/2014 | Mercier | ............ | B60G 17/0157 |
| | | | | 180/210 |
| 8,781,684 B2* | 7/2014 | Bruce | .................. | B62D 5/0457 |
| | | | | 701/41 |
| 9,045,015 B2* | 6/2015 | Spahl | ...................... | B60G 17/00 |
| 9,193,407 B2* | 11/2015 | Muth | ...................... | B62J 99/00 |
| 9,248,857 B2* | 2/2016 | Spahl | ...................... | B62D 9/02 |
| 9,527,543 B2* | 12/2016 | Mercier | .................. | B62K 5/05 |
| 9,821,620 B2* | 11/2017 | Saeger | ............... | B60G 17/0164 |
| 9,845,129 B2* | 12/2017 | Simon | .................. | B60G 21/055 |
| 9,925,843 B2* | 3/2018 | Spahl | ...................... | B60G 21/05 |
| 9,963,168 B2* | 5/2018 | Suzuki | .................. | B60G 3/145 |
| 10,023,019 B2* | 7/2018 | Spahl | ...................... | B60G 21/05 |
| 10,040,478 B2* | 8/2018 | Horiguchi | ................ | B62K 5/08 |
| 10,112,675 B2* | 10/2018 | Takenaka | ............... | B62K 21/00 |
| 10,207,762 B2* | 2/2019 | Takenaka | ................ | B62K 5/10 |
| 2008/0238005 A1* | 10/2008 | James | ...................... | B62D 9/02 |
| | | | | 280/5.509 |
| 2014/0019006 A1* | 1/2014 | Bruce | .................. | B62D 5/0457 |
| | | | | 701/41 |

FOREIGN PATENT DOCUMENTS

JP    2014-069673       4/2014
WO   WO-2005075278 A1 *  8/2005   ............... B62D 9/02

OTHER PUBLICATIONS

Translation of JP 2000-219146 A. Accessed on Jan. 3, 2020 at IP.com. (Year: 2000).*
Japanese Office Action dated Sep. 10, 2019, 4 pages.

* cited by examiner

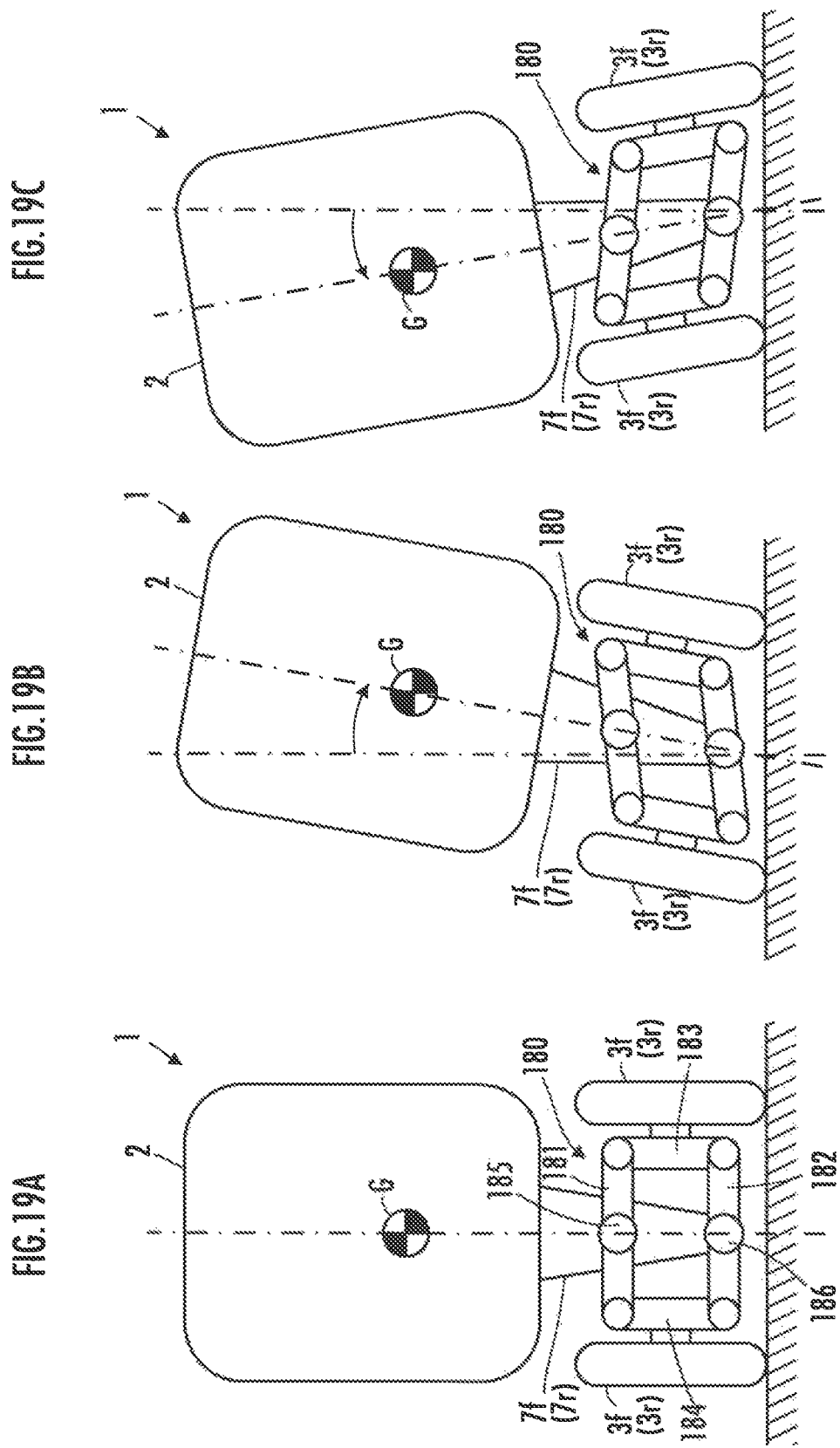

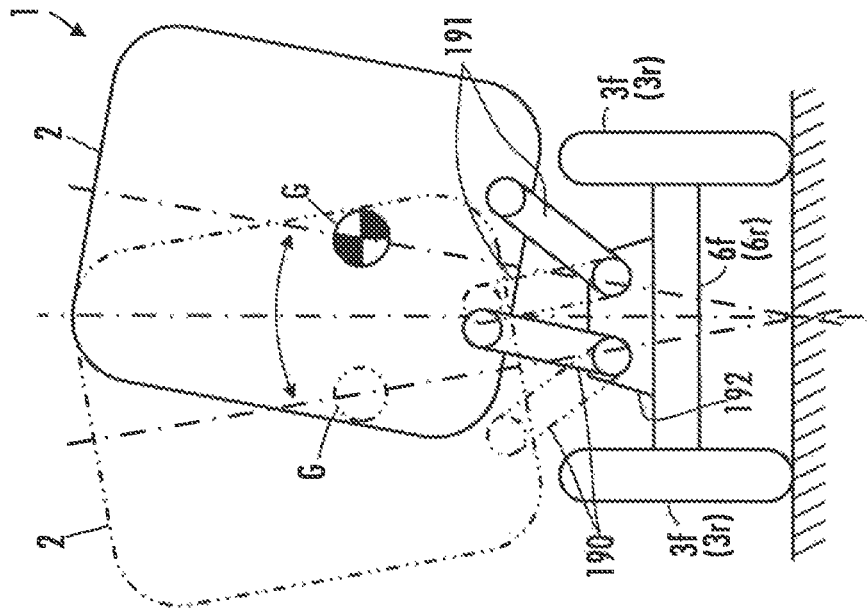
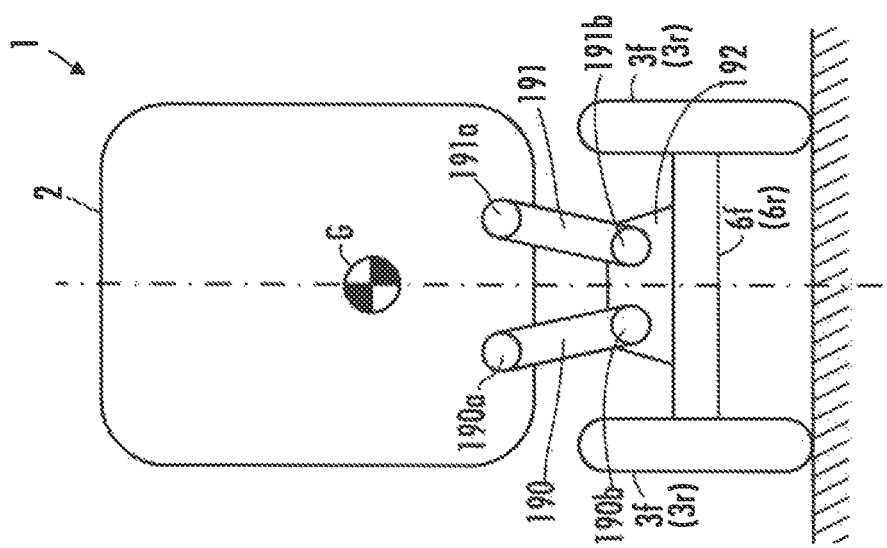

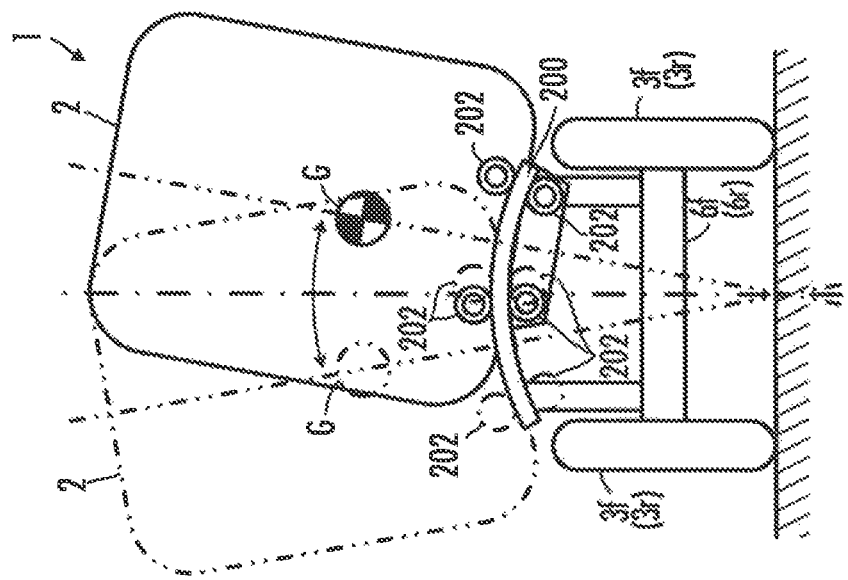
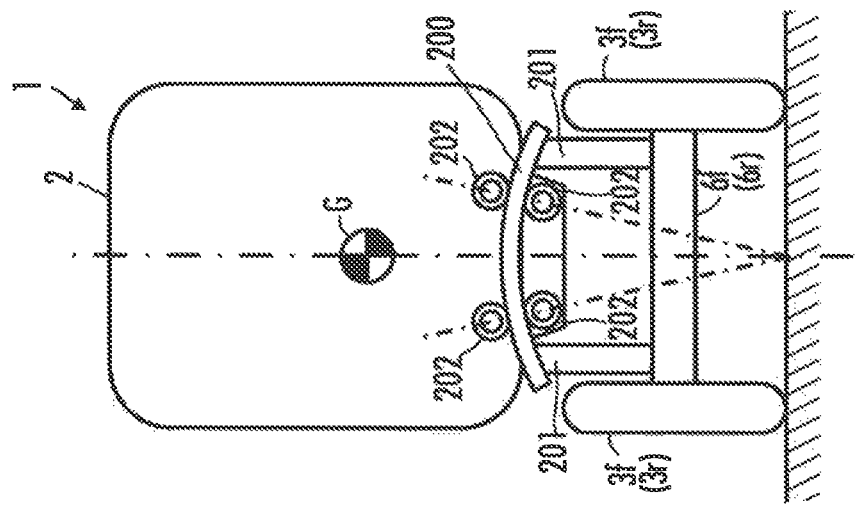

VEHICLE

BACKGROUND OF THE INVENTION

Field of the Invention

The present invention relates to a vehicle which has three or more wheels and which is driven such that the body thereof is tilted toward the center of turning when the vehicle turns.

Description of the Related Art

Hitherto, as this type of vehicle, there has been known a vehicle described in, for example, Japanese Patent Application Laid-Open No. 2014-69673 or U.S. Pat. No. 5,741,278. These publications describe three-wheel vehicles, each of which has one front wheel on the front side of the body thereof and two, namely, a pair of left and right, rear wheels on the rear side of the vehicle body.

The three-wheel vehicle is provided with an actuator that tilts the vehicle body. When the vehicle turns, the body thereof is tilted toward the center of turning by the actuator.

According to the prior arts described in the foregoing publications, for example, if a driver operates a steering wheel to turn the vehicle while the vehicle is traveling in a straight line, then the vehicle body is forcibly tilted toward the center of turning by the actuator in response to the steering operation.

In this case, immediately after the turning of the vehicle is started, an inertial force and a centrifugal force attributable to the tilt will act on the vehicle body toward the opposite side from the center of turning (toward the outer side of a turning path of the vehicle).

Hence, a ground contact load tends to be concentrated on the front wheel or the outer wheel of the rear wheels, immediately after the turning of the vehicle begins, thus leading to a danger of the front wheel or the inner wheel of the rear wheels being lifted up.

Further, immediately after the start of the turning of the vehicle, an acceleration change in the lateral direction acting on the driver becomes relatively large, frequently causing the upper body of the driver to swing. As a result, the center of gravity of the entire vehicle, including the driver, may sway and resultantly impair the robustness of the control of the actuator.

SUMMARY OF THE INVENTION

The present invention has been made in view of the background described above, and it is an object of the invention to provide a vehicle that reduces an influence that causes a driver to feel an unpleasant sensation in steering and which is capable of proper vehicle travel, in the case where a steering wheel is operated to start turning when the vehicle is traveling in a straight line or the steering wheel is operated to further increase the operation amount of the steering wheel while the vehicle is turning.

To this end, a vehicle in accordance with the present invention includes: a vehicle body which has a driver boarding section; a front wheel and a rear wheel, which are disposed with an interval provided therebetween in a longitudinal direction of the vehicle body; a steering wheel which can be operated by a driver; a tilt actuator which tilts the vehicle body in a roll direction; and a controller which has a function for controlling the tilt actuator to tilt the vehicle body according to at least an operation of the steering wheel, at least one of the front wheel and the rear wheel being composed of a plurality of wheels arranged in parallel in a vehicle width direction, wherein the front wheel and the rear wheel are provided such that the front wheel and the rear wheel can be steered by a steering mechanism including one or more steering actuators which can be controlled by the controller, and the controller is configured to control the steering actuator or actuators, in a case where the steering wheel is operated in a turning direction of the vehicle from a straight line traveling state of the vehicle, so as to change a steering angle of the front wheel toward a steering angle specified according to an operation amount observed after the steering wheel is operated, and also to change a steering angle of the rear wheel to an opposite direction of the turning direction of the vehicle immediately after the steering wheel is operated (a first aspect of the invention).

In the first aspect of the invention, the phrase "to change the steering angle of the rear wheel in an opposite direction of the turning direction of the vehicle" means to change the steering angle of the rear wheel such that the rear wheel is directed to the right (such that the rear wheel rotates clockwise about the steering axis when the vehicle is observed from above) in the case where the turning direction of the vehicle is a leftward turning direction toward the traveling direction of the vehicle. Further, the phrase "to change the steering angle of the rear wheel in an opposite direction of the turning direction of the vehicle" means to change the steering angle of the rear wheel such that the rear wheel is directed to the left (such that the rear wheel rotates counterclockwise about the steering axis when the vehicle is observed from above) in the case where the turning direction of the vehicle is a rightward turning direction toward the traveling direction of the vehicle.

Further, the phrase "to change the steering angle of the front wheel toward a steering angle specified according to an operation amount after the steering wheel is operated" does not limitedly refer to a manner in which the steering angle of the front wheel is monotonically brought close to a steering angle specified according to the operation amount after operating the steering wheel (hereinafter may be referred to as "the steering angle specified by steering wheel operation") immediately after the steering wheel is operated, and the phrase also includes a manner in which the steering angle of the front wheel is monotonically brought close to the steering angle specified by steering wheel operation after the steering angle of the front wheel is temporarily changed in the opposite direction from the direction toward the steering angle specified by steering wheel operation during the initial stage immediately after the steering wheel is operated, or after the steering angle of the front wheel is temporarily maintained to be constant during the initial stage immediately after the steering wheel is operated.

The above applies to a second aspect of the invention to be discussed hereinafter.

According to the first aspect of the invention described above, the steering actuator or actuators are controlled as described above, so that a behavior occurs, in which a part of a vehicle that is in contact with a ground temporarily moves to the opposite side from the center of turning immediately after the steering wheel is operated, i.e. immediately after the vehicle starts to turn. Thus, even if the vehicle body is tilted toward the center of turning by the tilt actuator in response to the operation of the steering wheel, the inertial force that acts on the opposite side from the center of turning with respect to the vehicle body immediately after the steering wheel is operated, will be reduced.

As a result, the vehicle body can be tilted while ideally securing the road holding performance of the front wheel or the rear wheel.

In addition, since the inertial force acting on the vehicle body is reduced, the movement of the center of gravity of the entire vehicle including a driver will be smoother. This permits improved robustness of the control of the tilt actuator or the steering actuator.

According to the first aspect of the invention, therefore, in the case where the steering wheel is operated to start the turning when the vehicle is traveling in a straight line, the influence that causes the driver to feel an unpleasant sensation in steering can be reduced, and the travel of the vehicle can be properly performed.

The first aspect of the invention, which provides the operation and effect as described above, is ideally suited to a case where the controller is configured to control the steering actuator or actuators and also to control the tilt actuator to tilt the vehicle body toward a center of turning of the vehicle in the case where the steering wheel is operated in the turning direction of the vehicle from the straight line traveling state of the vehicle (a second aspect of the invention).

Further, a vehicle in accordance with the present invention includes: a vehicle body which has a driver boarding section; a front wheel and a rear wheel, which are disposed with an interval provided therebetween in a longitudinal direction of the vehicle body; a steering wheel which can be operated by a driver; a tilt actuator which tilts the vehicle body in a roll direction; and a controller which has a function for controlling the tilt actuator to tilt the vehicle body according to at least an operation of the steering wheel, at least one of the front wheel and the rear wheel being composed of a plurality of wheels arranged in parallel in a vehicle width direction, wherein the front wheel and the rear wheel are provided such that the front wheel and the rear wheel can be steered by a steering mechanism including one or more steering actuators which can be controlled by the controller, and the controller is configured to control the steering actuator or actuators, in a case where the steering wheel is operated to increase an operation amount of the steering wheel from a prescribed operation amount while the vehicle is in a turning state, so as to change a steering angle of the front wheel toward a steering angle specified according to an operation amount observed after the steering wheel is operated, and also to change a steering angle of the rear wheel to an opposite direction of a turning direction of the vehicle immediately after the steering wheel is operated (a third aspect of the invention).

According to the third aspect of the invention, the steering actuator or actuators are controlled as described above, so that a behavior occurs, in which the vehicle temporarily moves to the opposite side from the center of turning immediately after the steering wheel is operated to increase the operation amount of the steering wheel from a prescribed operation amount. Hence, even when the vehicle body is further tilted toward the center of turning by the tilt actuator or actuators according to the operation of the steering wheel (as the operation amount of the steering wheel increases), the inertial force that acts on the vehicle body in the opposite side from the center of turning immediately after the steering wheel is operated will be reduced.

As a result, the vehicle body can be further tilted while ideally securing the road holding performance of the front wheel or the rear wheel.

In addition, since the inertial force acting on the vehicle body is reduced, the movement of the center of gravity of the entire vehicle including a driver will be smoother. This permits improved robustness of the control of the tilt actuator, or the steering actuator or actuators.

According to the third aspect of the invention, therefore, in the case where the steering wheel is operated to further increase the operation amount of the steering wheel when the vehicle is turning, the influence that causes the driver to feel an unpleasant sensation in steering can be reduced and the travel of the vehicle can be properly performed.

The third aspect of the invention, which provides the operation and effect as described above, is ideally suited to a case where the controller is configured to control the steering actuator or actuators and also to control the tilt actuator to further tilt the vehicle body toward a center of turning of the vehicle in the case where the steering wheel is operated to increase the operation amount of the steering wheel from a prescribed operation amount in the turning state of the vehicle (a fourth aspect of the invention).

In the first aspect of the invention or the second aspect of the invention described above, ideally, the controller is configured to control the steering actuator or actuators such that the steering angle of each of the front wheel and the rear wheel becomes the steering angle which is obtained by adding a steering angle component determined according to the operation of the steering wheel to a reference steering angle of each of the front wheel and the rear wheel specified according to the operation amount of the steering wheel, and also configured to determine the steering angle component such that the steering angle component becomes a component in an opposite direction of the turning direction of the vehicle and that a magnitude of the steering angle component increases and then decreases, immediately after the steering wheel is operated (a fifth aspect of the invention). This applies to the third aspect of the invention or the fourth aspect of the invention described above (a sixth aspect of the invention).

With this arrangement, the steering angle components of the front wheel and the rear wheel are determined as described above immediately after the steering wheel is operated, thus making it possible to smoothly achieve a behavior in which the vehicle temporarily moves to the opposite side from the center of turning immediately after the steering wheel is operated.

In the fifth aspect of the invention described above, ideally, the controller is configured to determine the steering angle component corresponding to the front wheel and the steering angle component corresponding to the rear wheel to have values which agree with each other or which are in directly proportional relation (a seventh aspect of the invention). This applies to the sixth aspect of the invention described above (an eighth aspect of the invention).

In the seventh aspect of the invention and the eighth aspect of the invention, the phrase "agree with each other" does not limitedly mean to exactly agree, but also includes the case of substantial agreement. Further, the phrase "values which are in directly proportional relation" means that one of the values is a value that is directly proportional to the other value (a value obtained by multiplying the other value by a positive constant).

According to the seventh aspect of the invention or the eighth aspect of the invention described above, the steering angle components will be steering angle components that enable the vehicle to travel in a translational manner. This makes it possible to further smoothly achieve a behavior in which the vehicle temporarily moves to the opposite side from the center of turning immediately after the steering wheel is operated.

In the fifth aspect of the invention or the seventh aspect of the invention described above, the controller is preferably configured to determine the steering angle components according to a value obtained by carrying out high-pass characteristic filtering on the operation amount of the steering wheel, immediately after at least the steering wheel is operated (a ninth aspect of the invention). This applies to the sixth aspect of the invention or the eighth aspect of the invention described above (a tenth aspect of the invention).

This arrangement makes it possible to smoothly increase or decrease the magnitude of the steering angle components immediately after the steering wheel is operated and to determine the magnitudes of the steering angle components by reflecting the change speed of the operation amount of the steering wheel.

As a result, the steering of the front wheel and the rear wheel immediately after the steering wheel is operated can be accomplished in a manner that is suited to the type of operation of the steering wheel.

In the fifth aspect of the invention, the seventh aspect of the invention or the ninth aspect of the invention, the controller may be configured to determine, when the operation amount after the steering wheel is operated converges to a prescribed value, the steering angle component such that the steering angle component corresponding to each of the front wheel and the rear wheel converges to a value of the steering angle component specified according to the operation amount of the prescribed value of the steering wheel or converges to zero after the magnitude of the steering angle component decreases (an eleventh aspect of the invention). This applies to the sixth aspect of the invention, the eighth aspect of the invention or the tenth aspect of the invention described above (a twelfth aspect of the invention).

With this arrangement, when the operation amount of the steering wheel converges to a prescribed value, the steering angle component also converges to a prescribed value. Thus, the front wheel and the rear wheel can be maintained at optimum steering angles when the operation amount of the steering wheel converges to a prescribed value.

BRIEF DESCRIPTION OF THE DRAWINGS

FIG. 19A, FIG. 19B and FIG. 19C are diagrams illustrating a second example of a tilt mechanism of a vehicle body;

FIG. 20A and FIG. 20B are diagrams illustrating a third example of the tilt mechanism of the vehicle body;

FIG. 21A and FIG. 21B are diagrams illustrating a fourth example of the tilt mechanism of the vehicle body.

DESCRIPTION OF THE PREFERRED EMBODIMENTS

First Embodiment

Figure 1:
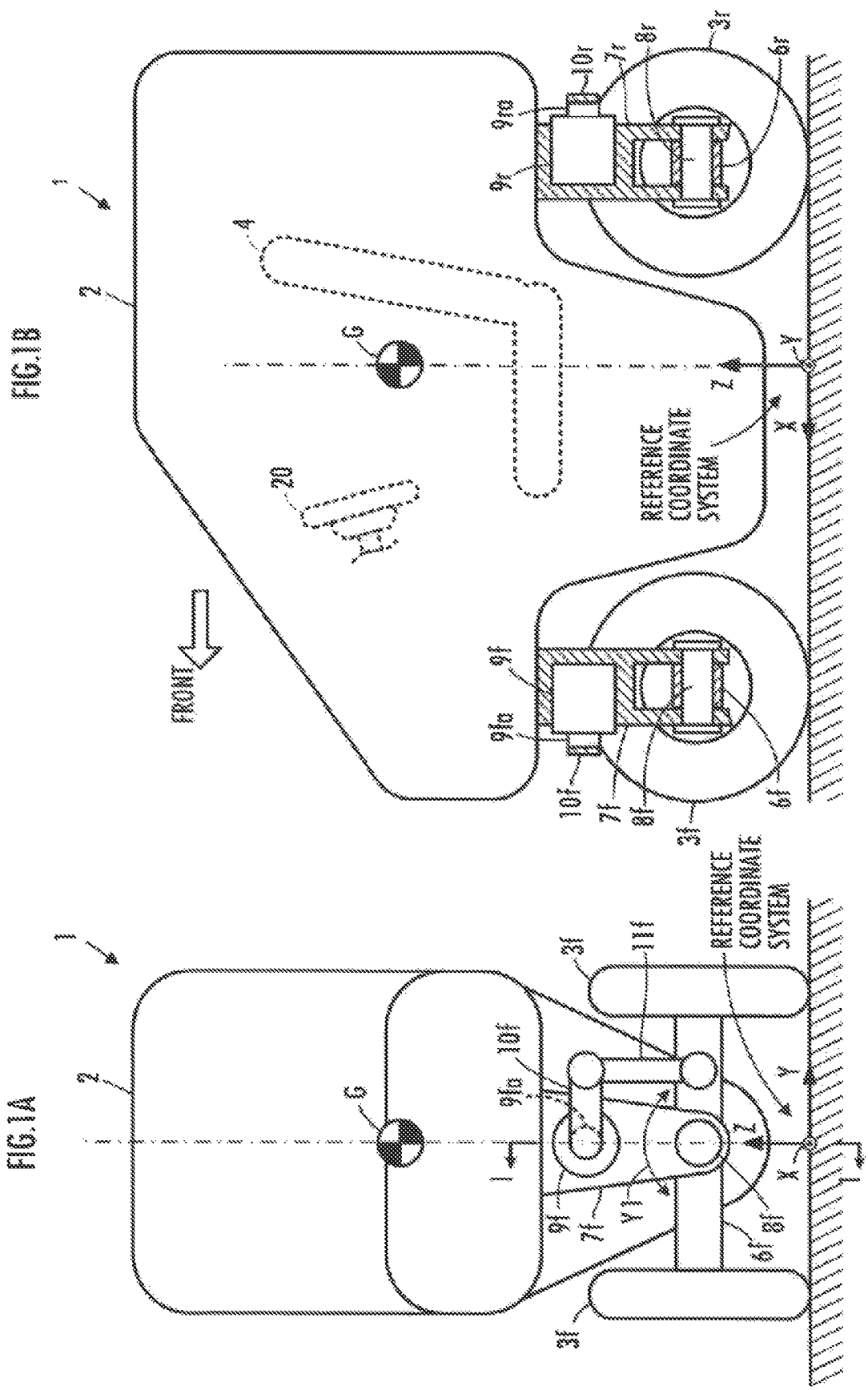
FIG. 1A is a schematic front view of a vehicle according to an embodiment.
FIG. 1B is a schematic side view of the vehicle according to the embodiment.

A first embodiment of the present invention will be described below with reference to FIG. 1A to FIG. 12.

Referring to FIG. 1A and FIG. 1B, a vehicle 1 according to the present embodiment has a body 2 and front wheels 3$f$ and rear wheels 3$r$, which are disposed with an interval provided in the longitudinal direction of the body 2. FIG. 1A and FIG. 1B schematically illustrate only the configuration of an essential section of the vehicle 1. Further, FIG. 1B is a sectional view illustrating the mechanism between the front wheels 3$f$ and the rear wheels 3$r$ and the body 2, the sectional view being taken on line I-I in FIG. 1A.

The vehicle 1 in the present embodiment is a four-wheel vehicle having a pair of left and right (two) front wheels 3$f$, 3$f$ arranged in parallel in the vehicle width direction and a pair of left and right (two) rear wheels 3$r$, 3$r$ arranged in parallel in the vehicle width direction. The interval (tread) between the front wheels 3$f$, 3$f$ and the interval (tread) between the rear wheels 3$r$, 3$r$ in the vehicle width direction of the vehicle 1 are smaller than those of an average four-wheel automobile. For example, these treads are smaller than the vehicle height of the vehicle 1.

Alternatively, the tread of the front wheels 3f, 3f and the tread of the rear wheels 3r, 3r may be intervals that are different from each other.

Mainly disposed in the cabin of the body 2 are a seat 4 serving as the boarding section for a driver, and a steering wheel 20 rotatively operated by a driver sitting on the seat 4 to set a traveling direction of the vehicle 1. The boarding section for a driver may alternatively be configured, for example, to enable the driver to be aboard standing.

Further, the vehicle 1 includes a front horizontal frame 6f extended in the vehicle width direction between the two front wheels 3f, 3f and a rear horizontal frame 6r extended in the vehicle width direction between the two rear wheels 3r, 3r.

The front wheels 3f are supported by the front horizontal frame 6f such that the front wheels 3f are steerable (rotatable) about the axes of steering shafts (king pin shafts 34), which will be discussed hereinafter. Further, the rear wheels 3r are supported by the rear horizontal frame 6r such that the rear wheels 3r are steerable (rotatable) about the axes of steering shafts (king pin shafts 47), which will be discussed hereinafter.

Further, the body 2 is supported by the front horizontal frame 6f and the rear horizontal frame 6r such that the body 2 can be tilted with respect to a road surface (the ground contact surfaces of the front wheels 3f and the rear wheels 3r) in a roll direction, which is the direction about the axis in the longitudinal direction of the body 2.

More specifically, a front arm 7f extended downward from the front of the body 2 is connected to the front horizontal frame 6f through a support shaft 8f having an axis in the longitudinal direction of the body 2. Similarly, a rear arm 7r extended downward from the rear of the body 2 is connected to the rear horizontal frame 6r through a support shaft 8r sharing the common axis with the support shaft 8f.

Figure 2:
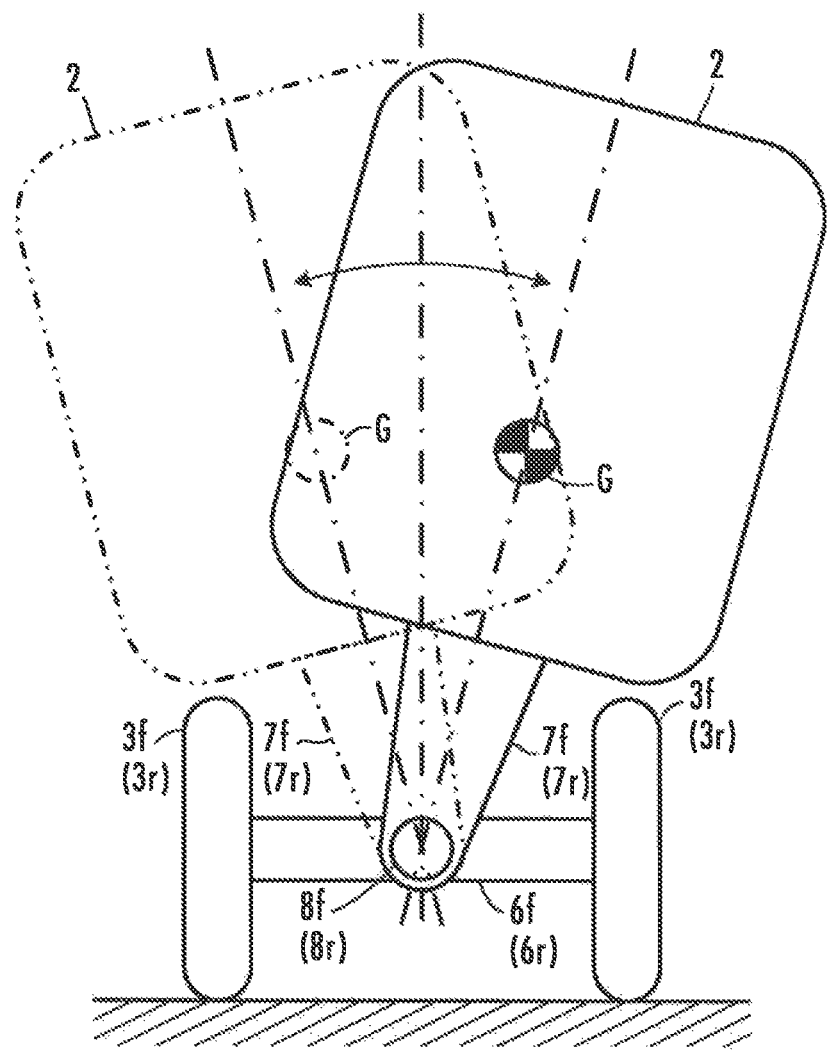
FIG. 2 is a diagram illustrating the body of the vehicle according to the embodiment, the body being in a tilted state.

In this case, the front arm 7f and the rear arm 7r are journaled so as to be rotatable about the axis of the support shafts 8f and 8r, respectively, as indicated by an arrow Y1 in FIG. 1A. This enables the body 2 to tilt about the axis of the support shafts 8f, 8r (i.e. in the roll direction), as indicated by the solid line or the two-dot chain line in FIG. 2. In FIG. 2, the reference numerals on the rear wheel 3r side are denoted by parenthesized reference numerals.

Further, the vehicle 1 includes two tilt actuators 9f, 9r for tilting the body 2, which are provided adjacently to the front wheels 3f and the rear wheels 3r, respectively. These tilt actuators 9f, 9r are composed of, for example, electric motors.

The tilt actuator 9f adjacent to the front wheels 3f (hereinafter may be referred to as "the front tilt actuator 9f") is attached to the front arm 7f with the axis of an output shaft 9fa (rotary drive shaft) thereof oriented in the longitudinal direction. Further, the output shaft 9fa of the front tilt actuator 9f is connected to the front horizontal frame 6f through a first link 10f and a second link 11f, which act as a power transmission mechanism.

In this case, the first link 10f is extended from the output shaft 9fa such that the first link 10f can be rotated integrally with the output shaft 9fa. Further, one end of the second link 11f is journaled by the distal end of the first link 10f such that the one end of the second link 11f can be relatively rotated about the axis in the longitudinal direction with respect to the first link 10f. Further, the other end of the second link 11f is journaled by the front horizontal frame 6f such that the other end of the second link 11f can be relatively rotated about the axis in the longitudinal direction with respect to the front horizontal frame 6f at a place beside the support shaft 8f.

The tilt actuator 9r adjacent to the rear wheels 3r (hereinafter may be referred to as "the rear tilt actuator 9r") is attached to the rear arm 7r such that an output shaft 9ra (rotary drive shaft) thereof is coaxial with the output shaft 9fa of the front tilt actuator 9f. Further, the output shaft 9ra of the rear tilt actuator 9r is connected to the rear horizontal frame 6r through the first link 10r and the second link (not illustrated), which have the same configuration as those adjacent to the front wheels 3f.

The output shafts 9fa, 9ra of the tilt actuators 9f and 9r, respectively, are connected to the horizontal frames 6f and 6r, respectively. Thus, the power (the rotary drive force) is generated in one or both of the tilt actuators 9f and 9r thereby to generate a moment that causes the body 2 to relatively rotate about the axis of the support shafts 8f, 8r with respect to the horizontal frames 6f, 6r. This in turn causes a moment that tilts the body 2 in the roll direction with respect to a road surface (the moment will be hereinafter referred to as "the roll moment") to act on the body 2.

In this case, the roll moment by the front tilt actuator 9f is generated mainly by the front wheels 3f receiving a reaction force (ground contact load) from a road surface, whereas the roll moment by the rear tilt actuator 9r is generated mainly by the rear wheels 3r receiving a reaction force (ground contact load) from a road surface.

Supplementarily, each of the tilt actuators 9f, 9r may be composed of an actuator other than an electric motor, e.g. a hydraulic actuator. In addition, each of the tilt actuators 9f, 9r is not limited to a rotary type actuator and may alternatively be a direct acting type actuator.

Figure 3:
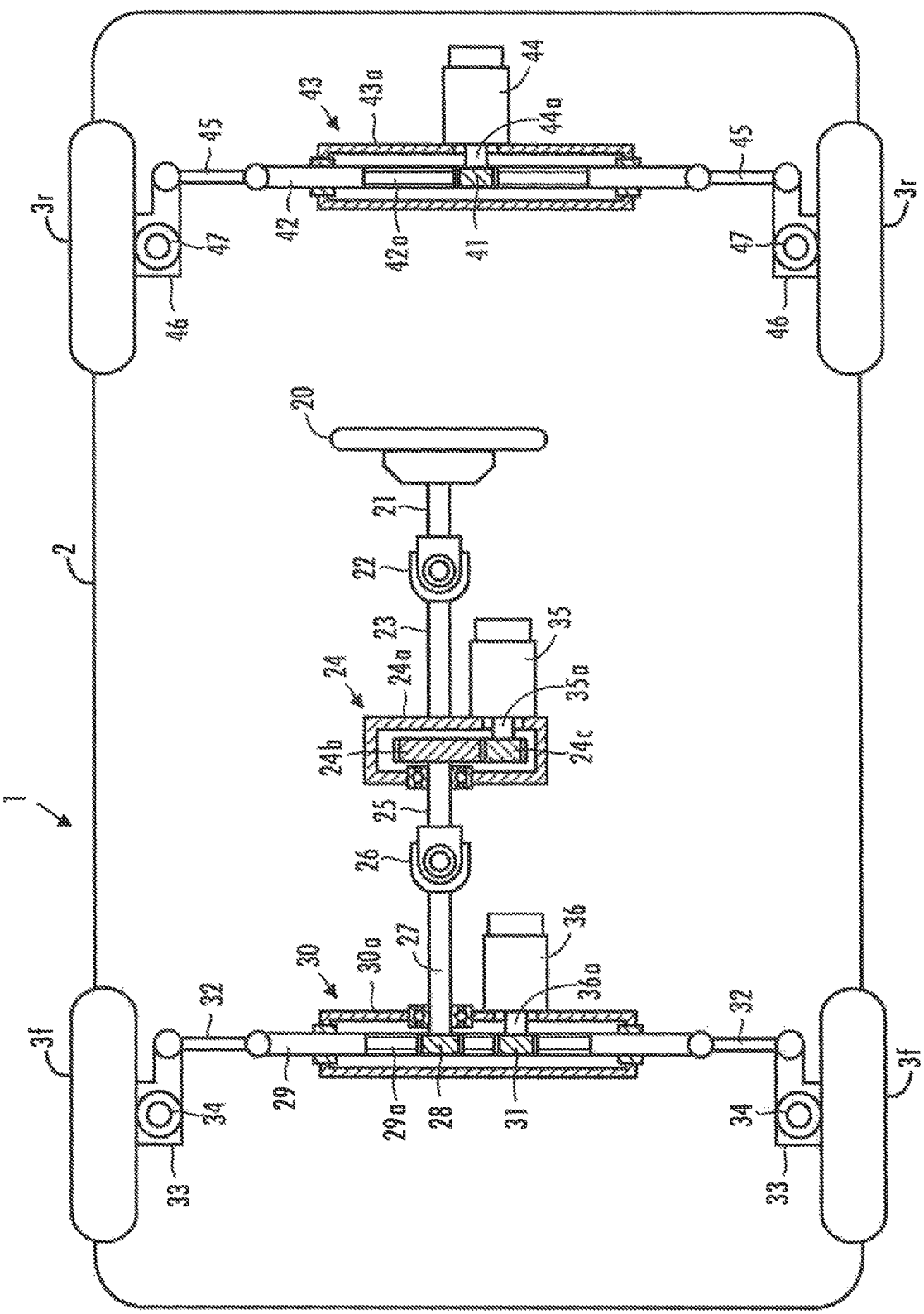
FIG. 3 is a diagram illustrating a steering mechanism of the vehicle according to a first embodiment or a second embodiment.

Referring now to FIG. 3, the configuration of the steering mechanism of the vehicle 1 will be described. In the vehicle 1 according to the present embodiment, both the front wheels 3f and the rear wheels 3r are steering wheels. Further, in the vehicle 1, a steering mechanism for the front wheels 3f and a steering mechanism for the rear wheels 3r are provided as steering mechanisms that are independent from each other, as illustrated in FIG. 3.

The steering mechanism for the front wheels 3f is configured to be capable of steering the front wheels 3f according to the turning operation of the steering wheel 20 (hereinafter referred to simply as "the wheel 20") and also capable of variably controlling the steering angle of the front wheels 3f according to the rotational angle of the wheel 20.

To be more specific, in an example of the present embodiment, the steering mechanism for the front wheels 3f has a gear box 30, which includes a pinion 28 to which the rotation of the wheel 20 is transmitted, and a rack bar 29 which has a rack 29a meshed with the pinion 28, a front wheel steering angle control actuator 35 for variably controlling the steering angles of the front wheels 3f according to the rotational angle of the wheel 20, and a steering force assist actuator 36, which generates an assist force that assists the turning operation of the wheel 20 performed by a driver (an assist force that reduces the steering force imparted to the wheel 20 from the driver).

The front wheel steering angle control actuator 35 and the steering force assist actuator 36 are composed of, for example, electric motors. The front wheel steering angle control actuator 35 and a rear wheel steering angle control actuator 44, which will be discussed hereinafter, correspond to the steering actuators in the present invention.

The rack bar 29 extends in the vehicle width direction between the left and right front wheels 3f, 3f and slidably passes through a chassis 30a of the gear box 30. Further, the rack 29a is formed in a part of the rack bar 29, the part being inside the chassis 30a. The chassis 30a is fixed to the front horizontal frame 6f.

Both ends of the rack bar 29 are connected through tie rods 32 to knuckles 33, which rotatably support the left and right front wheels 3f, 3f. In this case, each of the knuckles 33 can be rotated about the axis of the king pin shaft 34, which is a steering shaft, with respect to the front horizontal frame 6f. Hence, as the rack bar 29 is moved in the vehicle width direction, the front wheels 3f are rotated (steered) about the axes of the king pin shafts 34.

An example of a rotation transmission mechanism, which transmits rotation from the wheel 20 to the pinion 28, according to the present embodiment is configured to transmit the rotation of the wheel 20 to the pinion 28 via a first rotating shaft 21, which is a rotating shaft of the wheel 20, a second rotating shaft 23 connected to the first rotating shaft 21 through a universal joint 22, a third rotating shaft 25 connected to the second rotating shaft 23 through a gear box 24, and a fourth rotating shaft 27 connected to the third rotating shaft 25 through a universal joint 26 in this order.

The distal end of the fourth rotating shaft 27 is inserted in the chassis 30a of the gear box 30 and coaxially connected to the pinion 28 so as to be rotatable integrally with the pinion 28 in the chassis 30a.

The gear box 24 between the second rotating shaft 23 and the third rotating shaft 25 includes gears (spur gears) 24b, 24c meshed with each other in a chassis 24a of the gear box 24.

Further, the second rotating shaft 23 is connected to the chassis 24a so as to be rotatable integrally with the chassis 24a. Further, an end of the third rotating shaft 25, which end is adjacent to the gear box 24, is inserted in the chassis 24a coaxially with the second rotating shaft 23 and also connected coaxially with a gear 24b so as to be rotatable integrally with the gear 24b in the chassis 24a.

Further, the front wheel steering angle control actuator 35 is attached to the chassis 24a of the gear box 24. In addition, an output shaft 35a (rotary drive shaft) of the front wheel steering angle control actuator 35 is inserted in the chassis 24a and connected to a gear 24c so as to be rotatable integrally with the gear 24c in the chassis 24a.

Therefore, servo-controlling the front wheel steering angle control actuator 35 in synchronization with the rotation of the wheel 20 makes it possible to rotate the pinion 28 in synchronization with the rotation of the wheel 20 (i.e. to steer the front wheels 3f, 3f through the rack bar 29) and also to variably adjust the rotational angle of the pinion 28 (i.e. the movement amount of the rack bar 29 and the steering angles of the front wheels 3f, 3f) according to the rotational angle of the wheel 20.

Additionally accommodated in the chassis 30a of the gear box 30 including the rack bar 29 is a pinion 31 meshed with the rack 29a beside the pinion 28. Further, the steering force assist actuator 36 is attached to the chassis 30a.

Further, an output shaft 36a (rotary drive shaft) of the steering force assist actuator 36 is inserted in the chassis 30a and connected coaxially with the pinion 31 in the chassis 30a so as to be rotatable integrally with the pinion 31.

Accordingly, the assist force that assists the steering force for turning the wheel 20 (hereinafter referred to as "the steering assist force") can be imparted to the rack bar 29 by imparting the rotary driving force to the pinion 31 from the steering force assist actuator 36.

In this case, the rack bar 29 is moved thereby to steer the front wheels 3f, 3f by the resultant power of the power transmitted from the wheel 20 to the rack bar 29 through the pinion 28 and the power transmitted from the steering force assist actuator 36 to the rack bar 29 through the pinion 31. Thus, the steering force required to turn the wheel 20 will be reduced.

The steering mechanism for the rear wheels 3r is configured to be capable of variably controlling the steering angles of the rear wheels 3r. To be more specific, in an example of the present embodiment, the steering mechanism for the rear wheels 3r has a gear box 43, which includes a pinion 41 and a rack bar 42 which has a rack 42a meshed with the pinion 41, and a rear wheel steering angle control actuator 44 for variably controlling the steering angles of the rear wheels 3r. The rear wheel steering angle control actuator 44 according to the present embodiment is composed of, for example, an electric motor.

The rack bar 42 extends in the vehicle width direction between the left and right rear wheels 3r, 3r and slidably passes through a chassis 43a of the gear box 43. Further, the rack 42a is formed in a part of the rack bar 42, the part being inside the chassis 43a. The chassis 43a is fixed to the rear horizontal frame 6r.

Both ends of the rack bar 42 are connected through tie rods 45 to knuckles 46, which rotatably support the left and right rear wheels 3r, 3r. In this case, each of the knuckles 46, which support each of the rear wheels 3r can be rotated about the axes of the king pin shafts 47, which are steering shafts, with respect to the rear horizontal frame 6r. Hence, as with the case of the front wheels 3f, the rear wheels 3r are rotated (steered) about the axes of the king pin shafts 47 as the rack bar 42 is moved in the vehicle width direction.

The rear wheel steering angle control actuator 44 is attached to the chassis 43a of the gear box 43. An output shaft 44a (rotary drive shaft) of the rear wheel steering angle control actuator 44 is inserted in the chassis 43a and connected coaxially with the pinion 41 in the chassis 43a so as to be rotatable integrally with the pinion 41.

Therefore, servo-controlling the rear wheel steering angle control actuator 44 makes it possible to control the rotational angle of the pinion 41 (i.e. the movement amount of the rack bar 42) and thereby to control the steering angles of the rear wheels 3r, 3r.

Supplementarily, the configurations of the steering mechanisms of the front wheels 3f and the rear wheels 3r are not limited to those described above, and a variety of other configurations may be adopted.

For example, each of the front wheel steering angle control actuator 35, the steering force assist actuator 36, and the rear wheel steering angle control actuator 44 may be composed of an actuator other than an electric motor, e.g. a hydraulic actuator. In addition, the front wheel steering angle control actuator 35, the steering force assist actuator 36, and the rear wheel steering angle control actuator 44 are not limited to rotary type actuators and may alternatively be direct acting type actuators.

Further, the steering force assist actuator 36 may be configured to impart the assist force to, for example, a rotation transmission mechanism between the wheel 20 and the pinion 28.

Further, the steering mechanism adjacent to the front wheels 3f may be provided with, for example, a planetary gear mechanism or a differential gear mechanism or the like in place of the gear box 24.

Although not illustrated in FIG. 1A to FIG. 3, the vehicle 1 includes, in addition to the mechanisms described above, a traveling actuator 50 (illustrated in FIG. 4), which generates power for travel. The traveling actuator 50 is composed of, for example, an electric motor. Further, the traveling actuator 50 transmits power to the drive wheels among the front wheels 3*f* and the rear wheels 3*r* (the two front wheels 3*f*, 3*f* or the two rear wheels 3*r*, 3*r* or all wheels of the front wheels 3*f*, 3*f* and the rear wheels 3*r*, 3*r*) through the intermediary of an appropriate power transmission mechanism (not illustrated), including a speed reducer or a transmission or the like. The power transmission mechanism may adopt a publicly known structure.

The traveling actuator 50 may be, for example, a hydraulic actuator or an internal-combustion engine, rather than being limited to an electric motor. Alternatively, the traveling actuator 50 may include a plurality of types of actuators (e.g. an electric motor and an internal-combustion engine). Further, each drive wheel may be provided with the traveling actuator 50.

Figure 4:
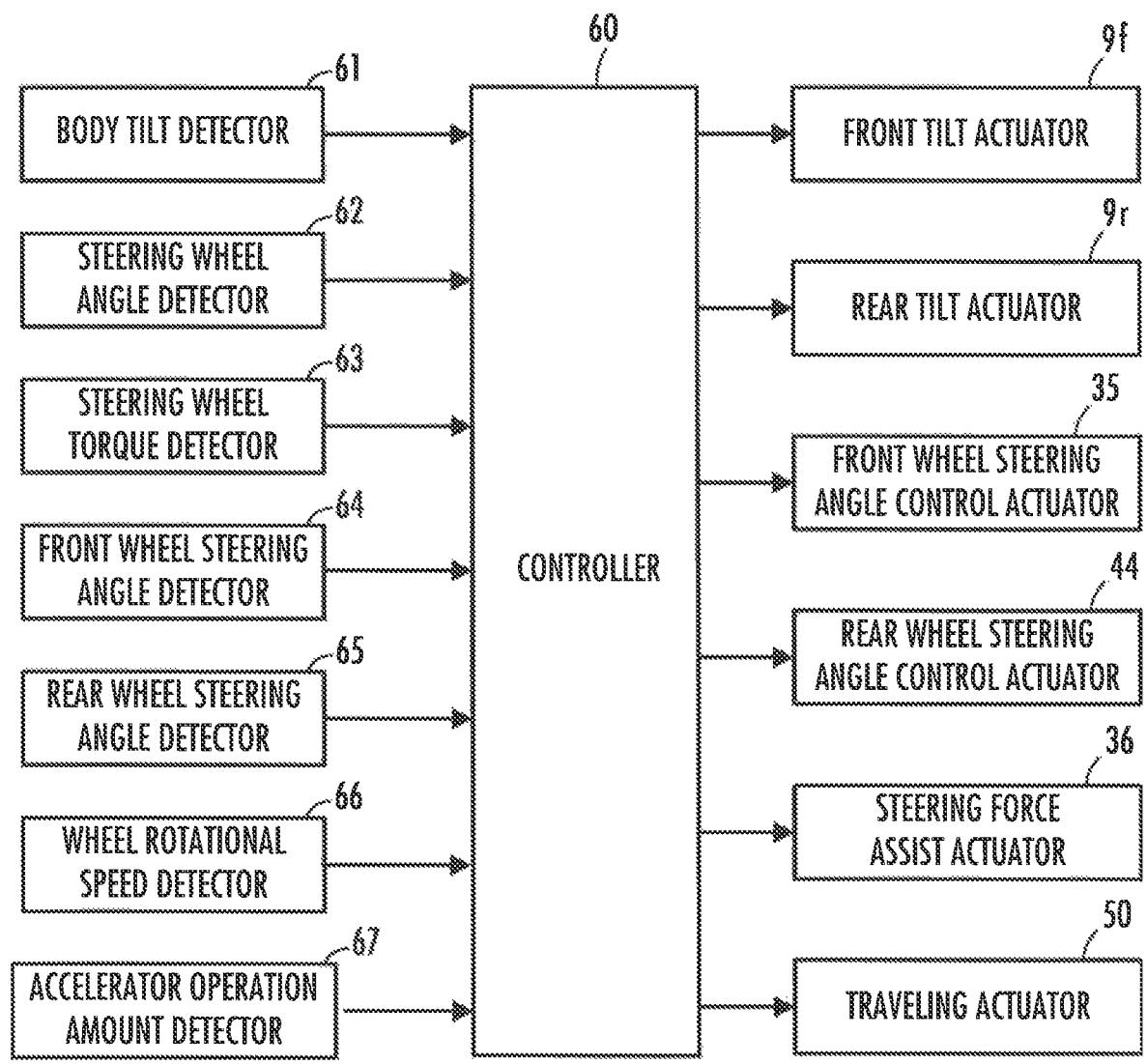
FIG. 4 is a block diagram illustrating the configuration related to a control of the vehicle according to the first embodiment or the second embodiment.

Referring now to FIG. 4, the configuration related to the operation control of the vehicle 1 will be described. As illustrated in FIG. 4, the vehicle 1 includes a controller 60, which carries out control processing for controlling the operations of the tilt actuators 9*f*, 9*r*, the front wheel steering angle control actuator 35, the rear wheel steering angle control actuator 44, the steering force assist actuator 36, and the traveling actuator 50.

The vehicle 1 further includes, as the sensors for detecting various types of state amounts required for the control processing by the controller 60, a body tilt detector 61 for detecting the tilt angle of the body 2 in the roll direction, a steering wheel angle detector 62 for detecting the steering wheel angle, which is the rotational angle of the wheel 20, a steering wheel torque detector 63 for detecting the steering wheel torque, which is the torque (rotational force) imparted to the wheel 20, a front wheel steering angle detector 64 for detecting the front wheel steering angle, which is the rotational angle about the steering axis of the front wheel 3*f* (about the axis of the king pin shaft 34), a rear wheel steering angle detector 65 for detecting the rear wheel steering angle, which is the rotational angle about the steering axis of the rear wheel 3*r* (about the axis of the king pin shaft 47), a wheel rotational speed detector 66 for detecting the rotational speed of each of the wheels (each of the front wheels 3*f* and the rear wheels 3*r*), and an accelerator operation amount detector 67 for detecting the operation amount of an accelerator, which is the operation amount (the amount of depression) of an accelerator (gas) pedal (not illustrated) of the vehicle 1.

The body tilt detector 61 may be composed of, for example, an acceleration sensor, which outputs a detection signal based on the translational acceleration of the body 2, and a gyrosensor (angular velocity sensor), which outputs a detection signal based on the angular velocity of the body 2. In this case, the controller 60 can measure the tilt angle of the body 2 in the roll direction (more specifically, the tilt angle in the roll direction with respect to a vertical direction (gravitational direction)) by carrying out predetermined measurement arithmetic processing, such as strapdown arithmetic processing, on the basis of the outputs of the acceleration sensor and the gyrosensor.

In the description of the present embodiment, the tilt angle of the body 2 in the roll direction is the tilt angle of the body 2 from a reference attitude state of the vehicle 1. The reference attitude state of the vehicle 1 means the attitude state in which the vehicle 1 is steadily traveling in a straight line on a horizontal plane, i.e. the attitude state of the vehicle 1 in a state in which the body 2 is standing in the vertical direction and none of the front wheels 3*f* and the rear wheels 3*r* are being steered, as illustrated in FIG. 1A and FIG. 1B.

Further, the positive direction of the tilt angle of the body 2 in the roll direction is the direction in which the body 2 tilts to the right (the clockwise direction) when the vehicle 1 is observed from the rear side.

The steering wheel angle detector 62 is composed of a sensor that outputs a detection signal based on the rotational angle of the wheel 20. As the sensor, an angle sensor composed of, for example, a potentiometer, a rotary encoder, a resolver or the like can be used.

The steering wheel torque detector 63 is composed of a sensor that outputs a detection signal based on the torque imparted to the wheel 20 (hereinafter referred to as "the steering wheel torque"). A torque sensor or a force sensor, for example, can be used as the sensor.

The front wheel steering angle detector 64 is composed of a sensor that outputs a detection signal based on a front wheel steering angle, which is the rotational angle about the steering axis of the front wheel 3*f*. Similarly, the rear wheel steering angle detector 65 is composed of, for example, a sensor that outputs a detection signal based on the rear wheel steering angle, which is the rotational angle about the steering axis of the rear wheel 3*r*. As these sensors, angle sensors, such as potentiometers, rotary encoders, or resolvers can be used.

The front wheel steering angle is, more specifically, the rotational angle about the steering axis of the front wheel 3*f* from the reference attitude state of the vehicle 1, and the rear wheel steering angle is, more specifically, the rotational angle about the steering axis of the rear wheel 3*r* from the reference attitude state of the vehicle 1. Further, the positive direction of the front wheel steering angle is the direction in which the front wheel 3*f* rotates counterclockwise about the steering axis when the vehicle 1 is observed from above, and the positive direction of the rear wheel steering angle is the direction in which the rear wheel 3*r* rotates counterclockwise about the steering axis when the vehicle 1 is observed from above.

The wheel rotational speed detector 66 is composed of a sensor that outputs a detection signal based on the rotational speed of each of the wheels (the front wheels 3*f* or the rear wheels 3*r*). As the sensor, a rotary encoder, for example, can be used.

The accelerator operation amount detector 67 is composed of a sensor that outputs a detection signal based on the amount of depression of an accelerator (gas) pedal. As the sensor, an angle sensor, such as a potentiometer, a rotary encoder, or a resolver, or a displacement sensor can be used.

Supplementarily, the foregoing detectors 61 to 67 may be composed of sensors that detect one or more other state amounts that have a prescribed correlation with the state amounts of the objects to be detected. For example, as the front wheel steering angle detector 64, a displacement sensor that outputs a detection signal based on the displacement amount in the vehicle width direction of the rack bar 29 adjacent to the front wheels 3*f* can be used. Similarly, the rear wheel steering angle detector 65 can use, for example, a displacement sensor that outputs a detection signal based on the displacement amount in the vehicle width direction of the rack bar 42 adjacent to the rear wheels 3*r*.

The controller 60 is composed of a single or a plurality of electronic circuit units, including a CPU, a RAM, a ROM, an interface circuit and the like. The controller 60 is mounted at an appropriate place on the body 2. Further, the outputs (detection signals) of the foregoing detectors 61 to 67 are input to the controller 60.

Figure 5:
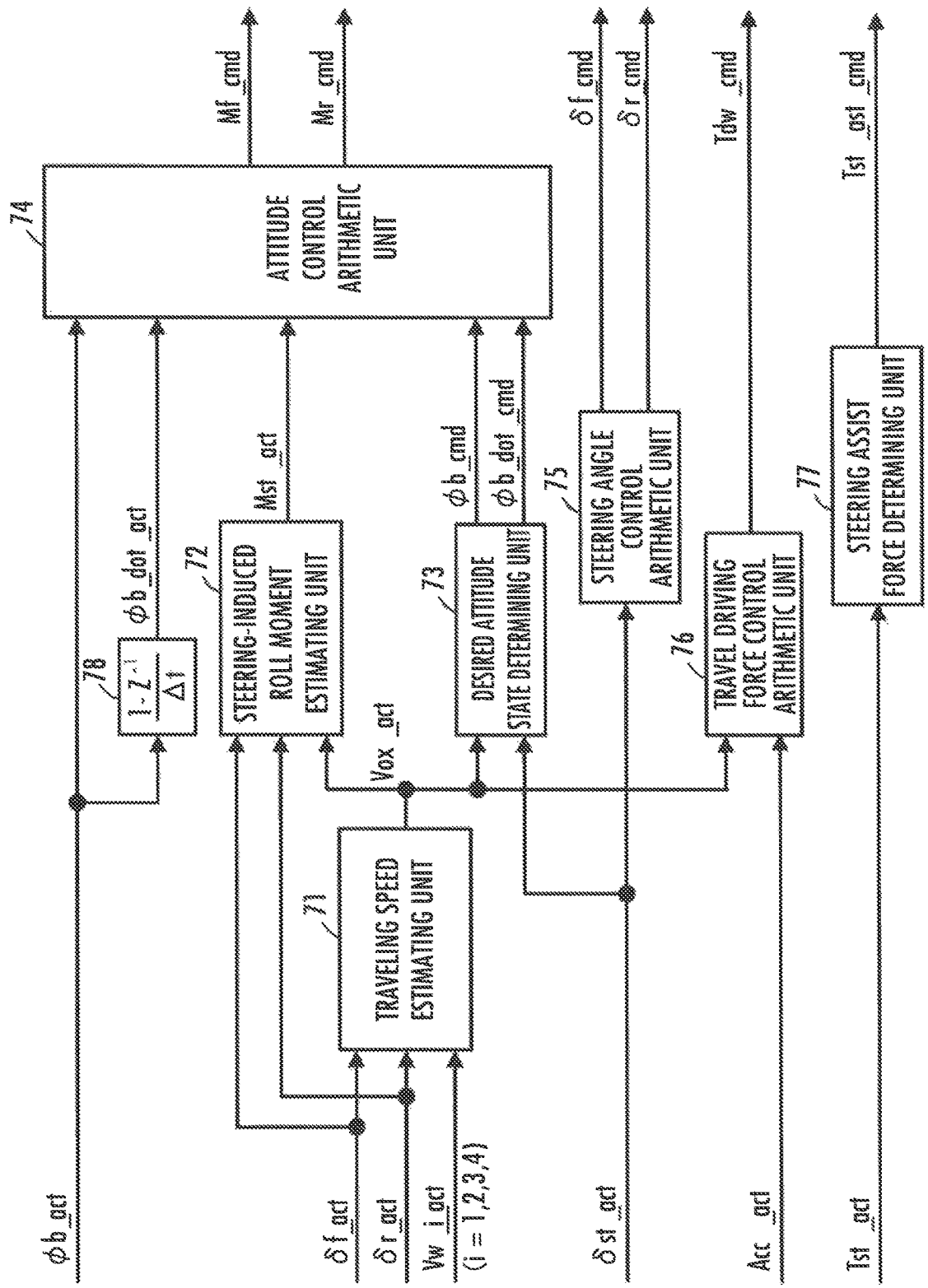
FIG. 5 is a block diagram illustrating the major functions of a controller in the first embodiment.

The controller 60 has the functions illustrated in the block diagram of FIG. 5 as the major functions implemented by the configuration of installed hardware or programs (software configuration).

In the following description, the reference coordinate system illustrated in FIG. 1A and FIG. 1B will be used. The reference coordinate system is a coordinate system in which the vertical direction (up-and-down direction) is defined as a Z-axis direction, the longitudinal direction of the body 2 is defined as an X-axis direction, and the direction orthogonal to the Z-axis direction and the X-axis direction is defined as a Y-axis direction. Further, the origin of the reference coordinate system is set such that the origin will be a point on a ground contact surface immediately below an overall center of gravity G of the vehicle 1 when the vehicle 1 is in the reference attitude state. In this case, the overall center of gravity G of the vehicle 1 moves on a YZ plane as the body 2 tilts in the roll direction. Further, the positive directions of the X-axis, the Y-axis and the Z-axis are a forward direction, a leftward direction and an upward direction, respectively.

Further, in the following description, as a reference numeral denoting an actual value of any state amount, such as the tilt angle, of the body 2 or an observed value (a detected value or an estimated value) thereof, a reference numeral having a suffix "_act" will be used. As a reference numeral denoting a desired value of any state amount, a reference numeral having a suffix "_cmd" will be used.

As illustrated in FIG. 5, the controller 60 includes a traveling speed estimating unit 71, which estimates a traveling speed Vox_act of the vehicle 1, a steering-induced roll moment estimating unit 72, which estimates a steering-induced roll moment Mst_act, which is a roll moment acting on the body 2 due to the steering of either the front wheels 3f or the rear wheels 3r or both the front wheels 3f and the rear wheels 3r, a desired attitude state determining unit 73, which determines the desired attitude state of the body 2 in the roll direction, and an attitude control arithmetic unit 74, which determines the control input (the operation amount) for controlling the attitude of the body 2 in the roll direction.

The traveling speed Vox_act estimated by the traveling speed estimating unit 71 is, more specifically, the moving speed of the body 2 (i.e. the X-axis direction component of the moving speed vector of the body 2) in the X-axis direction (the longitudinal direction of the body 2) in the reference coordinate system.

Further, the desired attitude state determined by the desired attitude state determining unit 73 in the present embodiment is, for example, a combination of a desired value $\phi b\_cmd$ of a tilt angle $\phi b$ of the body 2 in the roll direction (hereinafter referred to as "the roll angle $\phi b$") and a desired value $\phi b\_dot\_cmd$ of a temporal change rate of the roll angle $\phi b$ (i.e. an angular velocity $\phi b\_dot$). Hereinafter, the desired values $\phi b\_cmd$ and $\phi b\_dot\_cmd$ will be referred to as the desired roll angle $\phi b\_cmd$ and the desired roll angular velocity $\phi b\_dot\_cmd$.

Further, the control input determined by the attitude control arithmetic unit 74 in the present embodiment is, for example, a combination of a desired value Mf_cmd of a roll moment Mf on the front wheels 3f side (hereinafter referred to as "the desired front roll moment Mf_cmd") and a desired value Mr_cmd of a roll moment Mr on the rear wheels 3r side (hereinafter referred to as "the desired rear roll moment Mr_cmd").

The controller 60 further includes a steering angle control arithmetic unit 75, which determines a control input (operation amount) for controlling the steering angles of the front wheels 3f and the rear wheels 3r, a travel driving force control arithmetic unit 76, which determines a control input (operation amount) for controlling the travel driving force of the vehicle 1, and a steering assist force determining unit 77, which determines a desired value Tst_ast_cmd of the steering assist force of the wheel 20.

The control input determined by the steering angle control arithmetic unit 75 in the present embodiment is, for example, a combination of a desired value $\delta f\_cmd$ of a steering angle $\delta f$ of the front wheels 3f (hereinafter referred to as "the desired front wheel steering angle $\delta f\_cmd$) and a desired value $\delta r\_cmd$ of a steering angle $\delta r$ of the rear wheels 3r (hereinafter referred to as "the desired rear wheel steering angle $\delta r\_cmd$).

Further, the control input determined by the travel driving force control arithmetic unit 76 in the present embodiment is a desired value Tdw_cmd of a drive torque Tdw of the driving wheels of the vehicle 1 (hereinafter referred to as the desired driving wheel torque Tdw_cmd).

The desired driving wheel torque Tdw_cmd is, more specifically, the desired value of the total drive torque of the front wheels 3f, 3f (the total drive torque of the drive torques of the front wheels 3f, 3f) in the case where the driving wheels of the vehicle 1 are the front wheels 3f, 3f, or the desired value of the total drive torque of the rear wheels 3r, 3r (the total drive torque of the drive torques of the rear wheels 3r, 3r) in the case where the driving wheels of the vehicle 1 are the rear wheels 3r, 3r. Further, if the driving wheels of the vehicle 1 are all wheels (four wheels), namely, the front wheels 3f, 3f and the rear wheels 3r, 3r, then the desired driving wheel torque Tdw_cmd is the desired value of the total drive torque of all the wheels.

Further, the desired value Tst_ast_cmd determined by the steering assist force determining unit 77 (hereinafter referred to as "the desired steering assist force Tst_ast_cmd") in the present embodiment is, for example, the desired value of an assist torque Tst_ast added about the axis of the rotating shaft (the first rotating shaft 21) of the wheel 20.

The function unit denoted by a reference numeral 78 in FIG. 5 is a differential arithmetic unit that calculates the temporal change rate of the actual roll angle $\phi b\_act$ (observed value) of the body 2, i.e. the roll angular velocity $\phi b\_dot\_act$, by the differential arithmetic processing of the roll angle $\phi b\_act$.

The controller 60 sequentially carries out the processing by each of the function units at predetermined control processing cycles. Then, the controller 60 controls the front tilt actuator 9f and the rear tilt actuator 9r on the basis of the desired front roll moment Mf_cmd and the desired rear roll moment Mr_cmd determined by the attitude control arithmetic unit 74.

The controller 60 controls the front wheel steering angle control actuator 35 and the rear wheel steering angle control actuator 44 on the basis of the desired front wheel steering angle $\delta f\_cmd$ and the desired rear wheel steering angle $\delta r\_cmd$ determined by the steering angle control arithmetic unit 75.

Further, the controller 60 controls the traveling actuator 50 on the basis of the desired driving wheel torque Tdw_cmd determined by the travel driving force control arithmetic unit 76, and controls the steering force assist actuator 36 on the basis of the desired steering assist force Tst_ast_cmd determined by the steering assist force determining unit 77.

The following will describe in detail the control processing carried out by the controller 60. The controller 60 carries out the processing by the traveling speed estimating unit 71 at each arithmetic processing cycle. The traveling speed estimating unit 71 receives the observed values of the front wheel steering angle δf_act and the rear wheel steering angle δr_act, and the observed values of rotational movement velocities Vw_i_act (i=1, 2, 3 or 4) of the four wheels (the front wheels 3f, 3f and the rear wheels 3r, 3r), as illustrated in FIG. 5.

The observed value of the front wheel steering angle δf_act is the value indicated by an output of the front wheel steering angle detector 64, and the observed value of the rear wheel steering angle δr_act is the detected value indicated by an output of the rear wheel steering angle detector 65. Further, the observed value of the rotational movement velocity Vw_i_act (i=1, 2, 3 or 4) of each wheel is the value of the translational velocity (the so-called wheel velocity) obtained by multiplying the detected value of the rotational speed (angular velocity) of each wheel indicated by an output of the wheel rotational speed detector 66 by the effective rotation radius of the wheel.

Then, the traveling speed estimating unit 71 estimates the traveling speed Vox_act by predetermined arithmetic processing based on the foregoing received observed values.

For example, the estimated value of the translational movement velocity in the X-axis direction of the body 2 at a position between the front wheels 3f, 3f is calculated from the average value of the observed values of the rotational movement velocities Vw_1_act, Vw_2_act of the front wheels 3f, 3f, the observed value of the front wheel steering angle δf_act, and an existing set values of the caster angles of the front wheels 3f, 3f.

If the caster angles of the front wheels 3f, 3f are zero or nearly zero, then the estimated value of the translational movement velocity in the X-axis direction of the body 2 on the front wheel 3f side can be calculated without using the values of the caster angles.

Similarly, the estimated value of the translational movement velocity in the X-axis direction of the body 2 at a position between the rear wheels 3r, 3r is calculated from the average value of the observed values of the wheel rotational velocities Vw_3_act, Vw_4_act of the rear wheels 3r, 3r, the observed value of the rear wheel steering angle δr_act, and an existing set values of the caster angles of the rear wheels 3r, 3r.

If the caster angles of the rear wheels 3r, 3r are zero or nearly zero, then the estimated value of the translational movement velocity in the X-axis direction of the body 2 on the rear wheel 3r side can be calculated without using the values of the caster angles.

Then, the estimated value of either the translational movement velocity in the X-axis direction of the body 2 on the front wheel 3f side or the translational movement velocity in the X-axis direction of the body 2 on the rear wheel 3r side or the average value of the estimated values thereof is determined as the estimated value of the traveling speed Vox_act.

Supplementarily, only the translational movement velocity in the X-axis direction of the body 2 on the front wheel 3f side may be determined as the estimated value of the traveling speed Vox_act. In this case, the processing by the traveling speed estimating unit 71 does not require the observed values of the wheel rotational velocities Vw_3_act, Vw_4_act of the rear wheels 3r, 3r and the observed value of the rear wheel steering angle δr_act.

Alternatively, only the translational movement velocity in the X-axis direction of the body 2 on the rear wheel 3r side may be determined as the estimated value of the traveling speed Vox_act. In this case, the processing by the traveling speed estimating unit 71 does not require the observed values of the wheel rotational velocities Vw_1_act, Vw_2_act of the front wheels 3f, 3f and the observed value of the front wheel steering angle δf_act.

Subsequently, the controller 60 carries out the processing by the steering-induced roll moment estimating unit 72 and the desired attitude state determining unit 73.

Figure 6:
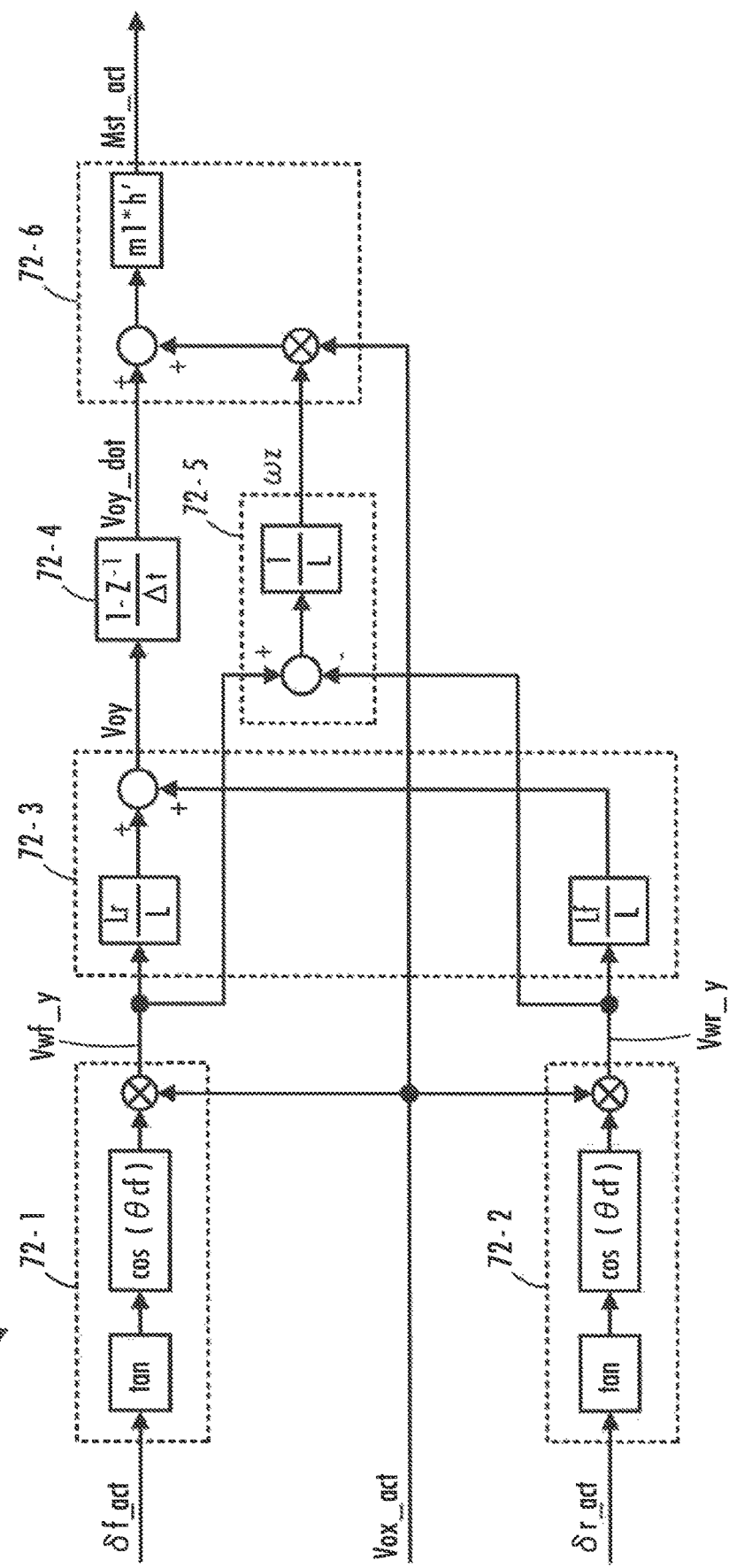
FIG. 6 is a block diagram illustrating the processing by a steering-induced roll moment estimating unit illustrated in FIG. 5.

The steering-induced roll moment estimating unit 72 receives the observed values of the front wheel steering angle δf_act and the rear wheel steering angle δr_act and the estimated value of the traveling speed Vox_act calculated by the traveling speed estimating unit 71, as illustrated in FIG. 5 or FIG. 6. The observed values of the front wheel steering angle δf_act and the rear wheel steering angle δr_act are the same detected values that are input to the traveling speed estimating unit 71.

Then, based on the foregoing input values, the steering-induced roll moment estimating unit 72 calculates the estimated value of the steering-induced roll moment Mst_act by the arithmetic processing illustrated by the block diagram in FIG. 6.

More specifically, the steering-induced roll moment estimating unit 72 calculates the estimated value of the steering-induced roll moment Mst_act by the arithmetic processing of expressions (1a) to (1f) given below.

$$Vwf\_y = Vox\_act \cdot \cos(\theta cf) \cdot \tan(\delta f\_act) \tag{1a}$$

$$Vwr\_y = Vox\_act \cdot \cos(\theta cr) \cdot \tan(\delta r\_act) \tag{1b}$$

$$Voy = (Lr/L) \cdot Vwf\_y + (Lf/L) \cdot Vwr\_y \tag{1c}$$

$$Voy\_dot = \text{Differential value of } Voy(\text{Temporal change rate}) \tag{1d}$$

$$\omega z = (Vwf\_y - Vwr\_y)/L \tag{1e}$$

$$Mst\_act = m1 \cdot h' \cdot (Vox\_act \cdot \omega z + Voy\_dot) \tag{1f}$$

Referring to FIG. 6, processing units 72-1 and 72-2 are the processing units that carry out the arithmetic processing of expressions (1a) and (1b), a processing unit 72-3 is the processing unit that carries out the arithmetic processing of expression (1c), a processing unit 72-4 is the processing unit that carries out the arithmetic processing (the differential arithmetic processing) of expression (1d), a processing unit 72-5 is the processing unit that carries out the arithmetic processing of expression (1e), and a processing unit 72-6 is the processing unit that carries out the arithmetic processing of expression (1f).

If the magnitude of the front wheel steering angle δf_act is sufficiently small, then the calculation of expression (1a) may be performed, taking tan(δf_act) as approximately δf_act. Similarly, if the magnitude of the rear wheel steering angle δr_act is sufficiently small, then the calculation of expression (1b) may be performed, taking tan(δr_act) as approximately δr_act.

In expressions (1a) to (1f) given above, δcf denotes the caster angle of the front wheel 3f (the tilt angle in the direction about the Y-axis with respect to the vertical direction of the steering axis of the front wheel 3f), Vwf_y denotes the horizontal velocity (the translational movement velocity in the Y-axis direction) of the front wheel 3f generated due to the steering of the front wheel 3f while the vehicle 1 is traveling, θcr denotes the caster angle of the rear wheel 3r (the tilt angle in the direction about the Y-axis with respect to the vertical direction of the steering axis of the rear wheel 3r), Vwr_y denotes the horizontal velocity (the translational movement velocity in the Y-axis direction) of the rear wheel 3r generated due to the steering of the rear wheel 3r while the vehicle 1 is traveling.

Further, L denotes the interval between the front wheels 3f and the rear wheels 3r in the X-axis direction (i.e. the wheelbase), Lf denotes the interval between the front wheels 3f and the overall center of gravity G of the vehicle 1 in the X-axis direction, Lr denotes the interval between the rear wheels 3r and the overall center of gravity G of the vehicle 1 in the X-axis direction, Voy denotes the horizontal velocity (the translational movement velocity in the Y-axis direction) of the vehicle 1 generated according to the foregoing horizontal velocities Vwf_y and Vwr_y of the front wheels 3f and the rear wheels 3r, respectively, at a position where a position in the X-axis direction becomes the same as the position of the overall center of gravity G (i.e. on the YZ plane of the reference coordinate system), and Voy_dot denotes the lateral acceleration (the translational acceleration in the Y-axis direction) indicated by the temporal change rate of the foregoing horizontal velocity Voy of the vehicle 1. L equals Lf plus Lr (L=Lf+Lr).

Further, ωz denotes the angular velocity in the yaw direction (yaw rate) of the vehicle 1 generated according to the difference between the horizontal velocities Vwf_vy and Vwr_y of the front wheels 3f and the rear wheels 3r.

Further, m1 denotes the set value of the mass of an inverted pendulum mass point in a dynamic model capable of representing the dynamic behaviors of the vehicle 1 involved in the tilt of the body 2 in the roll direction (the dynamic model will be discussed in detail hereinafter), and h' denotes the set value of the height of the inverted pendulum mass point.

Further, the first term of the right side (=m1·h'·Vox_act·ωz) of expression (1f) denotes the roll moment generated about the supporting point of the inverted pendulum mass point by the centrifugal force acting on the inverted pendulum mass point according to the traveling speed Vox_act of the vehicle 1 and the yaw rate ωz, and the second term of the right side (=m1·h'·Voy_dot) denotes the roll moment generated about the supporting point of the inverted pendulum mass point by the inertial force acting on the inverted pendulum mass point according to the lateral acceleration Voy_dot of the vehicle 1.

The steering-induced roll moment Mst_act calculated as described above is a roll moment that is generated by an inertial force dynamically produced due to the steering of the front wheels 3f or the rear wheels 3r without applying the roll moment to the body 2 by the tilt actuator 9f or 9r in the case where the front wheels 3f or the rear wheels 3r are steered while the vehicle 1 is traveling.

If a sensor (gyro sensor) that detects the yaw rate is mounted on the body 2, then the detected value of the yaw rate detected by the sensor may be used as the value of ωz used in the calculation of expression (1f).

Figure 7:
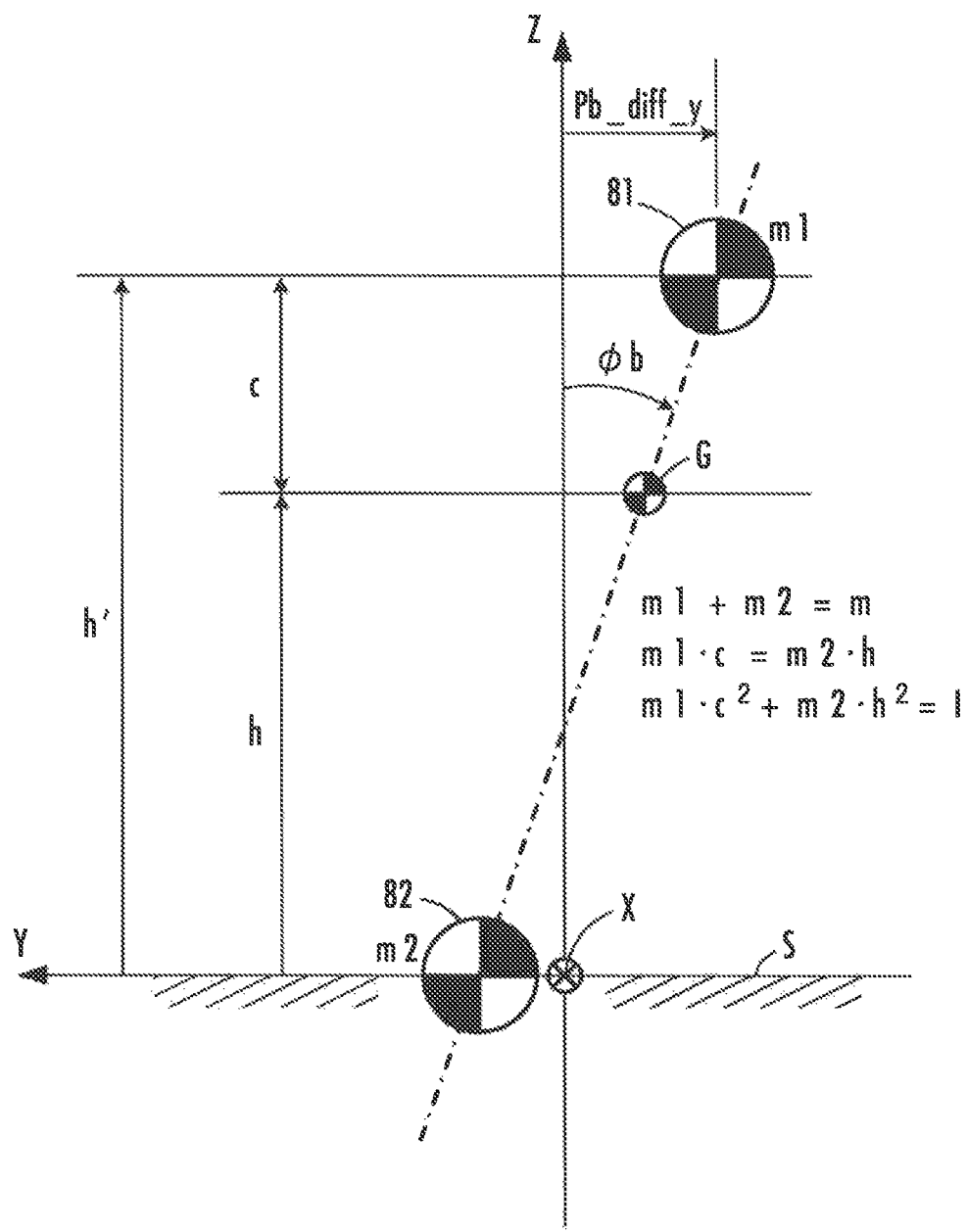
FIG. 7 is a diagram illustrating a model (two-mass-point model) representing a dynamic behavior of the vehicle.

Referring now to FIG. 7, the foregoing dynamic model will be described.

A dynamic behavior of the vehicle 1 whereby the body 2 is tilted in the roll direction (especially a behavior related to the tilt of the body 2 in the roll direction) can be described by, for example, a two-mass-point model.

As illustrated in FIG. 7, the foregoing two-mass-point model is composed of a mass point 81, which horizontally moves in the Y-axis direction according to the roll angle φb of the body 2 and the steering of the front wheels 3f or the rear wheels 3r above a horizontal ground contact surface S (horizontal road surface), and an on-the-ground-contact-surface mass point 82, which is a mass point horizontally moving in the Y-axis direction on a road surface according to the steering of the front wheels 3f or the rear wheels 3r independently of the roll angle φb of the body 2. In this case, the mass point 81 is the mass point that exhibits the same behavior as that of the mass point of an inverted pendulum, i.e. the foregoing inverted pendulum mass point. The XYZ coordinate system illustrated in FIG. 7 is the reference coordinate system described above.

The mass m1 and a height h' of the inverted pendulum mass point 81 in the two-mass-point model and a mass m2 of the on-the-ground-contact-surface mass point 82 are set such that the relationships denoted by (2a) to (2c) given below are satisfied (or approximately satisfied).

$$m1+m2=m \tag{2a}$$

$$m1 \cdot c = m2 \cdot h \tag{2b}$$

$$m1 \cdot c \cdot c + m2 \cdot h \cdot h = I \tag{2c}$$

$$\text{where } c = h' - h \tag{2d}$$

In these expressions, "m" denotes the overall mass of the vehicle 1, "h" denotes the height of the overall center of gravity G of the vehicle 1 in the reference attitude state, and "I" denotes the moment of inertia in the roll direction of the vehicle 1.

The moment of inertia I is, more specifically, a moment of inertia about an axis in the longitudinal direction passing through the overall center of gravity G of the vehicle 1 (an axis that is parallel to the X-axis). Further, the moment of inertia I is a moment of inertia of a part of the vehicle 1 that excludes a part thereof that does not tilt in the roll direction (including mainly the front wheels 3f, the rear wheels 3r, the front horizontal frame 6f and the rear horizontal frame 6r in the present embodiment).

According to the foregoing two-mass-point model, in the reference attitude state of the vehicle 1, the inverted pendulum mass point 81 and the on-the-ground-contact-surface mass point 82 are located at a position, the height of which is h' from the ground contact surface S, on the vertical line passing through the overall center of gravity G (i.e. on the Z-axis) and at a position on the ground contact surface S (a position, the height of which is zero from the ground contact surface S), respectively. Further, the inverted pendulum mass point 81 and the on-the-ground-contact-surface mass point 82 are positioned on a symmetric plane of the body 2. The symmetric plane is a plane, with respect to which the body 2 can be regarded laterally symmetrical.

Further, the inverted pendulum mass point 81 moves in the horizontal direction (the Y-axis direction) at the height h' according to a change in the roll angle φb of the body 2 from the reference attitude state and the steering of either the front wheels 3f or the rear wheels 3r or both the front wheels 3f and the rear wheels 3r. Further, the on-the-ground-contact-surface mass point 82 moves in the horizontal direction (the Y-axis direction) on the ground contact surface S according to the steering of either the front wheels 3f or the rear wheels 3r or both the front wheels 3f and the rear wheels 3r from the reference attitude state.

The tilt angle in the roll direction of the line segment that connects the inverted pendulum mass point 81 and the on-the-ground-contact-surface mass point 82 coincides with the roll angle φb of the body 2.

Further, the dynamic behavior of the inverted pendulum mass point 81 in the two-mass-point model is the same as the behavior of the mass point of an inverted pendulum. To be specific, the equation of motion of the inverted pendulum mass point 81 is represented by expression (3) given below.

$$m1*h'*Pb\_diff\_dot2\_y = m1*g*Pb\_diff\_y - M\text{sum} \tag{3}$$

where Pb_diff_y denotes the amount of movement of the inverted pendulum mass point 81 in the Y-axis direction from the position in the reference attitude state of the vehicle 1, Pb_diff_dot2_v denotes the second order differential value of the amount of horizontal movement of the inverted pendulum mass point Pb_diff_y (i.e. the translational acceleration in the Y-axis direction of the inverted pendulum mass point 81), and "g" denotes a gravitational acceleration constant.

Further, Msum denotes approximately a total roll moment of the roll moment imparted to the body 2 by the power of the tilt actuators 9f, 9r and the steering-induced roll moment Mst_act.

Supplementarily, the dynamic model described above approximates the behavior of the vehicle 1. For example, it is assumed that the instantaneous tilt center when the vehicle 1 tilts lies on the ground contact surface of the vehicle 1, and the influence of the height of the tilt center is ignored. It is possible, however, to create a dynamic model by taking the influence of, for example, the height of the tilt center of the vehicle 1, into account.

Referring back to FIG. 5, the desired attitude state determining unit 73 receives the observed value of a steering wheel angle δst_act and the estimated value of the traveling speed Vox_act calculated by the traveling speed estimating unit 71. The observed value of the steering wheel angle δst_act is the detected value indicated by an output of the steering wheel angle detector 62.

Then, based on the received values, the desired attitude state determining unit 73 determines the desired roll angle φb_cmd and the desired roll angular velocity φb_dot_cmd of the body 2 by predetermined arithmetic processing.

According to the present embodiment, the desired attitude state determining unit 73 sets the desired roll angular velocity φb_dot_cmd to zero. Further, the desired attitude state determining unit 73 determines the desired roll angle φb_cmd such that, when the vehicle 1 turns, the body 2 is tilted toward the center of turning (toward the center of curvature of a turning path). The turning center side is the right side of the vehicle 1 when the vehicle 1 turns to the right (turns in the clockwise direction as observed from above), and the left side of the vehicle 1 when the vehicle 1 turns to the left (turns in the counterclockwise direction as observed from above).

More specifically, the desired roll angle φb_cmd may be determined, for example, as described below. The desired attitude state determining unit 73 estimates the centrifugal force acting on the overall center of gravity G of the vehicle 1 from, for example, the observed value of the steering wheel angle δst_act and the estimated value of the traveling speed Vox_act by using a map prepared in advance. Then, the desired roll angle φb_cmd is determined such that the roll moment acting on the body 2 due to the centrifugal force and the roll moment acting on the body 2 due to the gravitational force acting on the overall center of gravity G of the vehicle 1 are balanced out.

In this case, the desired roll angle φb_cmd can be determined according to expression (4a) given below by using the estimated value of the centrifugal force.

$$\phi b\_cmd = \tan^{-1}(\text{Centrifugal force}/(m \cdot g)) \quad (4a)$$

In expression (4a), "m" and "g" denote the overall mass of the vehicle 1 and the gravitational acceleration constant, respectively, as described above. In this case, in the state in which the estimated value of the centrifugal force is zero, i.e. when the vehicle 1 is traveling in a straight line, the desired roll angle φb_cmd is zero.

Supplementarily, the desired roll angle φb_cmd may be directly determined on the basis of the observed value of the steering wheel angle δst_act and the estimated value of the traveling speed Vox_act by using a map prepared in advance.

Alternatively, the desired roll angle φb_cmd can be determined according to expression (4a) given above by using, for example, the value of the centrifugal force calculated on the basis of the value of the yaw rate ωz calculated according to expressions (1a), (1b), and (1e) given above or the detected value of ωz supplied by a sensor and the estimated value of the traveling speed Vox_act.

Further alternatively, for example, a value obtained by multiplying the value of a roll angle, at which the roll moment acting on the body 2 due to the centrifugal force and the roll moment acting on the body 2 due to the gravitational force acting on the overall center of gravity G of the vehicle 1 will be balanced out, by a positive coefficient set to a value below one (e.g. a value obtained by multiplying the right side of expression (4a) by the coefficient) may be determined as the desired roll angle φb_cmd.

The desired roll angular velocity φb_dot_cmd can be set to a value other than zero in, for example, the transient period in which the steering wheel angle δst_act or the front wheel steering angle δf_act or the rear wheel steering angle δr_act is in the middle of changing.

After carrying out the processing by the steering-induced roll moment estimating unit 72 and the processing by the desired attitude state determining unit 73 as described above, the controller 60 further carries out the processing by the attitude control arithmetic unit 74.

Figure 8:
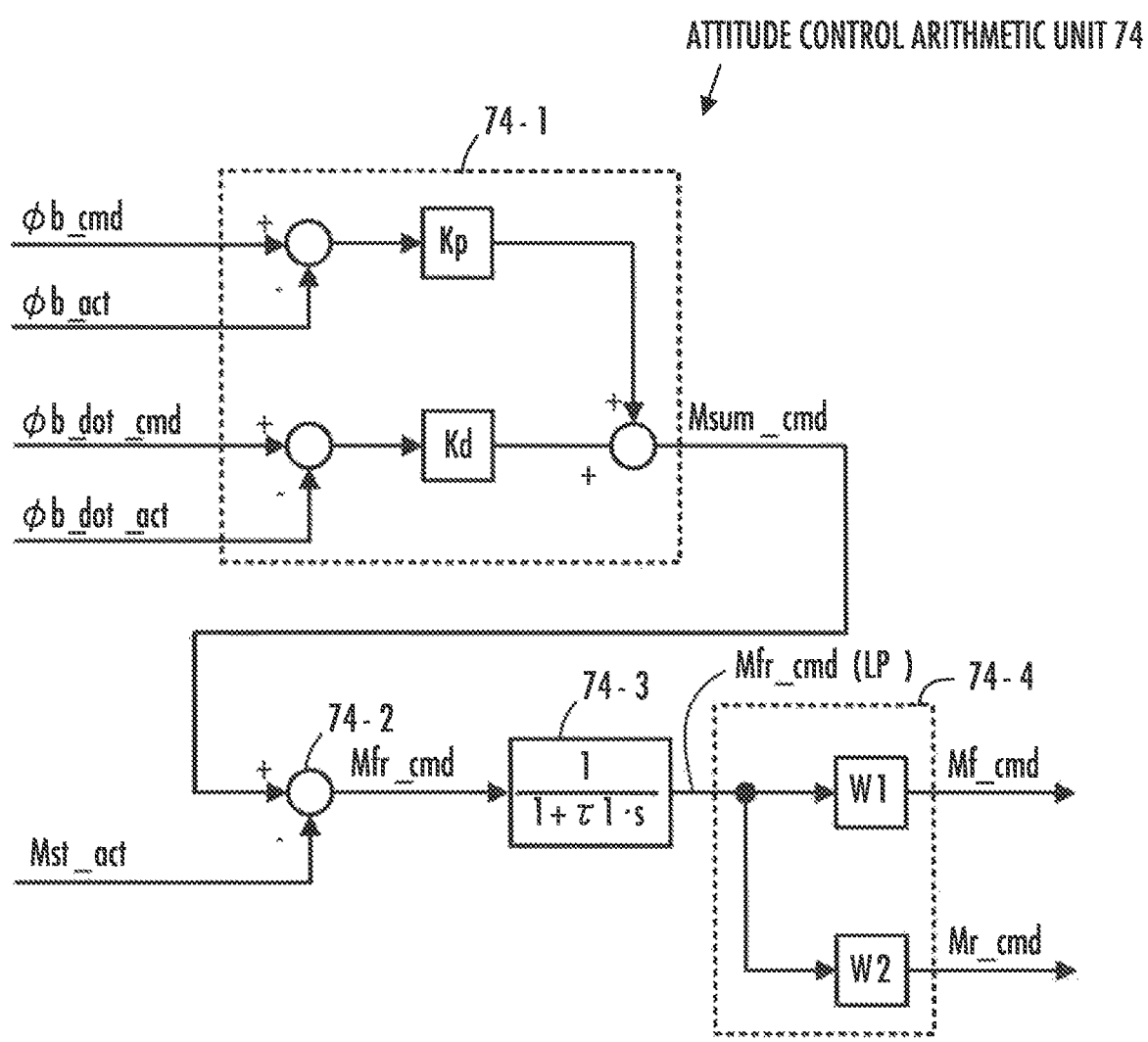
FIG. 8 is a block diagram illustrating the processing by an attitude control arithmetic unit illustrated in FIG. 5.

The attitude control arithmetic unit 74 receives the observed value of the roll angle φb_act of the body 2, the observed value of the roll angular velocity φb_dot_act of the body 2, the estimated value of the steering-induced roll moment Mst_act calculated by the steering-induced roll moment estimating unit 72, and the desired roll angle φb_cmd and the desired roll angular velocity φb_dot_cmd determined by the desired attitude state determining unit 73, as illustrated in FIG. 5 or FIG. 8. The observed value of the roll angle φb_act is a value indicated by an output (a detection signal) of the body tilt detector 61, and the observed value of the roll angular velocity φb_dot_act is a value obtained by differentiating the observed value of the roll angle φb_act by a differential arithmetic unit 78.

Then, the attitude control arithmetic unit 74 uses the foregoing input values to determine the combination of the desired front roll moment Mf_cmd and the desired rear roll moment Mr_cmd by the arithmetic processing illustrated by the block diagram of FIG. 8.

To be specific, the attitude control arithmetic unit 74 first carries out the processing by a processing unit 74-1 to determine a desired value Msum_cmd of the total roll moment that should be applied to the body 2 so as to converge the actual roll angle φb_act to the desired roll angle φb_cmd.

In the present embodiment, Msum_cmd is calculated according to, for example, expression (5a) given below. More specifically, Msum_cmd is calculated by a proportional plus derivative control law (PD control law), which is an example of a feedback control law.

$$M\text{sum\_cmd} = Kp \cdot (\phi b\_cmd - \phi b\_act) + Kd \cdot (\phi b\_dot\_cmd - \phi b\_dot\_act) \quad (5a)$$

In expression (5a), Kp and Kd denote gains of predetermined values.

Subsequently, the attitude control arithmetic unit 74 subtracts the steering-induced roll moment Mst_act from the foregoing desired value Msum_cmd to calculate a desired value Mfr_cmd of the roll moment that should be applied to the body 2 by the total power of the tilt actuators 9$f$ and 9$r$, as indicated by expression (5b) given below. This processing is the processing by a processing unit 74-2 in FIG. 8.

$$Mfr\_cmd = Msum\_cmd - Mst\_act \qquad (5b)$$

Then, the attitude control arithmetic unit 74 divides a filtered value Mfr_cmd(LP), which is obtained by carrying out low-pass characteristic filtering on the foregoing desired value Mfr_cmd, into a desired front roll moment Mf_cmd and a desired rear roll moment Mr_cmd according to expressions (5c) and (5d) given below. The filtering corresponds to the processing by a processing unit 74-3 in FIG. 8 and the dividing corresponds to the processing by a processing unit 74-4 in FIG. 8. The expression indicated in the processing unit 74-3 in FIG. 8 illustrates a transfer function which denotes the low-pass characteristic filtering.

$$Mf\_cmd = W1 \cdot Mfr\_cmd(LP) \qquad (5c)$$

$$Mr\_cmd = W2 \cdot Mfr\_cmd(LP) \qquad (5d)$$

W1 and W2 denote weight coefficients of predetermined values (≥0) set such that "W1+W2=1" holds. The values of the weight coefficients W1 and W2 are, for example, preset values that make it possible to prevent the distribution ratio between the ground contact load on the front wheel 3$f$ side and the ground contact load on the rear wheel 3$r$ side from deviating from a predetermined permissible range or to prevent one of the front wheels 3$f$, 3$f$ or one of the rear wheels 3$r$, 3$r$ from being lifted up. The values of W1 and W2 can be also variably set according to, for example, the acceleration or deceleration of the vehicle 1.

According to the present embodiment, the desired front roll moment Mf_cmd and the desired rear roll moment Mr_cmd are determined by the attitude control arithmetic unit 74 as described above.

In this case, the desired front roll moment Mf_cmd and the desired rear roll moment Mr_cmd are determined such that the roll angle φb_act and the roll angular velocity b_dot_act are brought close to the desired roll angle φb_cmd and the desired roll angular velocity φb_dot_cmd by the total roll moment of Mfr_cmd, which denotes the total roll moment of the desired front roll moment Mf_cmd and the desired rear roll moment Mr_cmd, and the steering-induced roll moment Mst_act.

Supplementarily, limit processing may be carried out on each of the desired front roll moment Mf_cmd and the desired rear roll moment Mr_cmd determined as described above so as to limit the values of Mf_cmd and Mr_cmd (the values of Mf_cmd and Mr_cmd used for actual control of the tilt actuators 9$f$ and 9$r$), which will be eventually determined by the attitude control arithmetic unit 74 at each control processing cycle, to values within a predetermined permissible range.

In other words, if the value of Mf_cmd calculated according to expression (5c) is over an upper limit value or below a lower limit value of the predetermined permissible range, then the value of Mf_cmd may be forcibly limited to the upper limit value or the lower limit value of the permissible range. The same applies to Mr_cmd.

Thus, the ground contact states of the front wheels 3$f$, 3$f$ and the rear wheels 3$r$, 3$r$ can be properly maintained more effectively. In this case, the permissible ranges of Mf_cmd and Mr_cmd may be variably set according to the acceleration or deceleration or the like of the vehicle 1.

The controller 60 controls the tilt actuators 9$f$, 9$r$ according to the desired front roll moment Mf_cmd and the desired rear roll moment Mr_cmd determined as described above. In this case, the output torque of the front tilt actuator 9$f$ is controlled to cause the front tilt actuator 9$f$ to output a desired torque that achieves the desired front roll moment Mf_cmd. Further, the output torque of the rear tilt actuator 9$r$ is controlled to cause the rear tilt actuator 9$r$ to output a desired torque that achieves the desired rear roll moment Mr_cmd.

The controller 60 further carries out the processing by the steering angle control arithmetic unit 75, the travel driving force control arithmetic unit 76, and the steering assist force determining unit 77 at each control processing cycle.

The travel driving force control arithmetic unit 76 receives the observed value of an accelerator operation amount Acc_act and the estimated value of the traveling speed Vox_act determined by the traveling speed estimating unit 71, as illustrated in FIG. 5. The observed value of the accelerator operation amount Acc_act is a value indicated by an output (a detection signal) of the accelerator operation amount detector 67.

Then, based on the input values, the travel driving force control arithmetic unit 76 determines the desired driving wheel torque Tdw_cmd by using a map prepared in advance or a conversion function represented by an arithmetic equation. In this case, the desired driving wheel torque Tdw_cmd is determined such that the desired driving wheel torque Tdw_cmd increases as Acc_act increases, and decreases as Vox_act increases.

The controller 60 determines the desired value of the output torque of the traveling actuator 50 that achieves the desired driving wheel torque Tdw_cmd determined as described above, and controls the output torque of the traveling actuator 50 according to the desired value.

The steering assist force determining unit 77 receives an observed value of the steering wheel torque Tst_act, as illustrated in FIG. 5. The observed value is the value indicated by an output (a detection signal) of the steering wheel torque detector 63.

Then, the steering assist force determining unit 77 determines a desired steering assist force Tst_ast_cmd on the basis of the value of the supplied steering wheel torque Tst_act. For example, the desired steering assist force Tst_ast_cmd is determined by multiplying the value of the steering wheel torque Tst_act by a gain of a predetermined value. The value of the gain can be variably set according to, for example, the traveling speed Vox_act.

The controller 60 determines the desired value of the output torque of the steering force assist actuator 36 that achieves the desired steering assist force Tst_ast_cmd determined as described above, and controls the output torque of the steering force assist actuator 36 according to the desired value.

Figure 9:
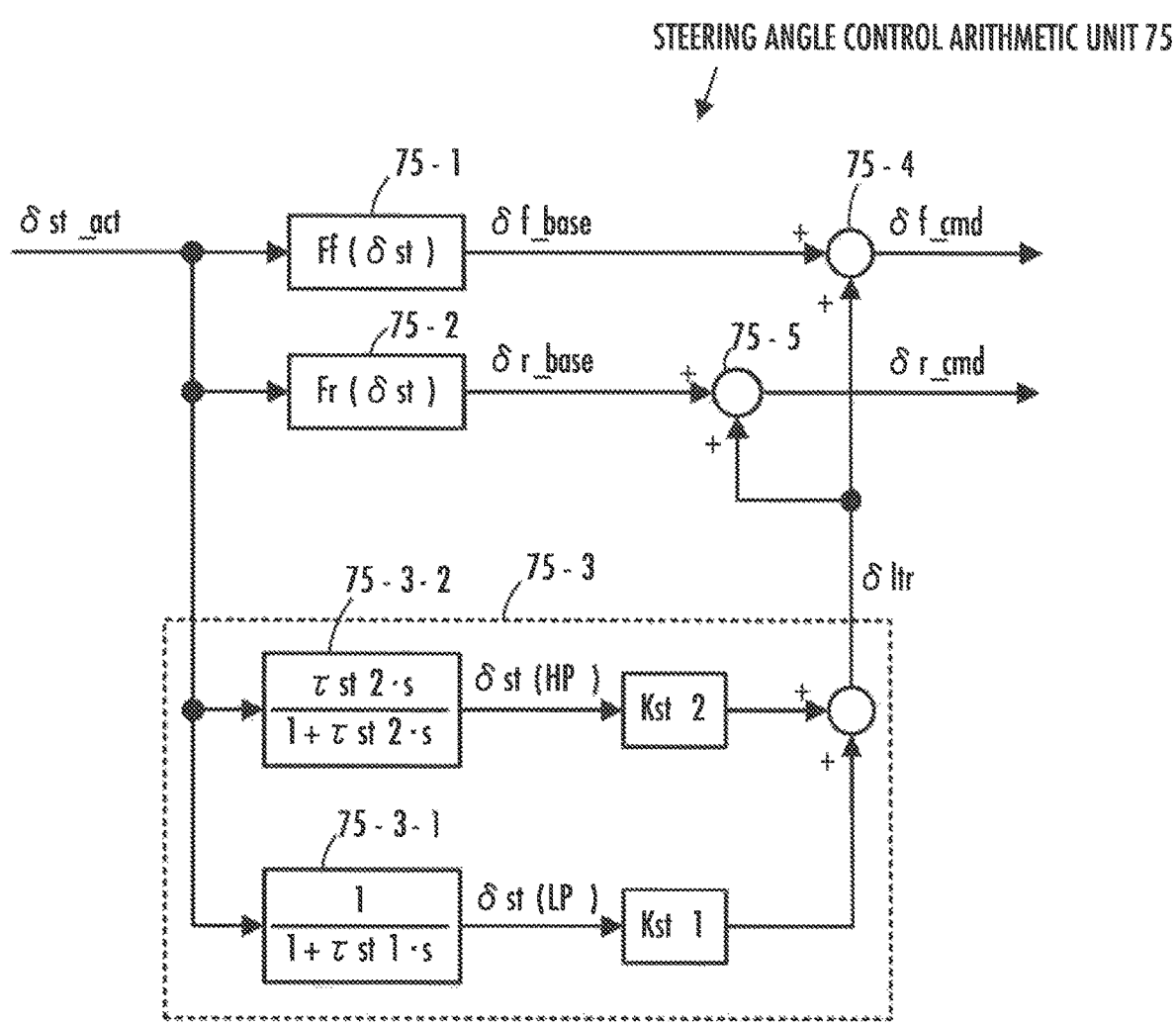
FIG. 9 is a block diagram illustrating the processing by a steering angle control arithmetic unit illustrated in FIG. 5.

The steering angle control arithmetic unit 75 receives an observed value of a steering wheel angle δst_act, as illustrated in FIG. 5 or FIG. 9. The observed value of the steering wheel angle δst_act is the value indicated by an output (a detection signal) of the steering wheel angle detector 62.

Then, the steering angle control arithmetic unit 75 determines the desired front wheel steering angle δf_cmd and the desired rear wheel steering angle δr_cmd by the arithmetic processing indicated by the block diagram of FIG. 9.

To be specific, the steering angle control arithmetic unit 75 determines a basic value δf_base of the front wheel steering angle δf and a basic value δr_base of the rear wheel steering angle δr by processing units 75-1 and 75-2, respectively, on the basis of the observed value of the supplied steering wheel angle δst_act. The basic values δf_base and δr_base correspond to the reference steering angles in the present invention.

In the processing by the processing unit 75-1, the δf_base is determined from the observed value of δst_act according to a map prepared in advance or by using a conversion function Ff represented by an arithmetic equation or the like. As the conversion function Ff, a function may be used, which function is created such that the value of δf_base monotonically increases as the value of the steering wheel angle δst increases, as illustrated by, for example, a solid line (the thin line) of the graph in FIG. 10A.

The form of change in the δf_base in response to a change in the value of the steering wheel angle δst is not limited to the form of the linear monotonous change (linear characteristic form). For example, as illustrated by the thin line of the graph in FIG. 10B, the conversion function Ff may be created such that the value of the δf_base monotonically changes in a curved manner (nonlinearly) in response to a change in the value of the steering wheel angle δst.

In the processing by the processing unit 75-2, the δr_base is determined from the observed value of δst_act according to a map prepared in advance or by using a conversion function Ff represented by an arithmetic equation or the like. As the conversion function Fr, a function may be used, which function is created such that the difference between the value of the δf_base and the value of the δr_base at any value of δst monotonically increases in response to an increase in the value of δst, as illustrated by, for example, a solid line (the thick line), the dashed line, or the two-dot chain line of the graph in FIG. 10A.

Figure 10A:
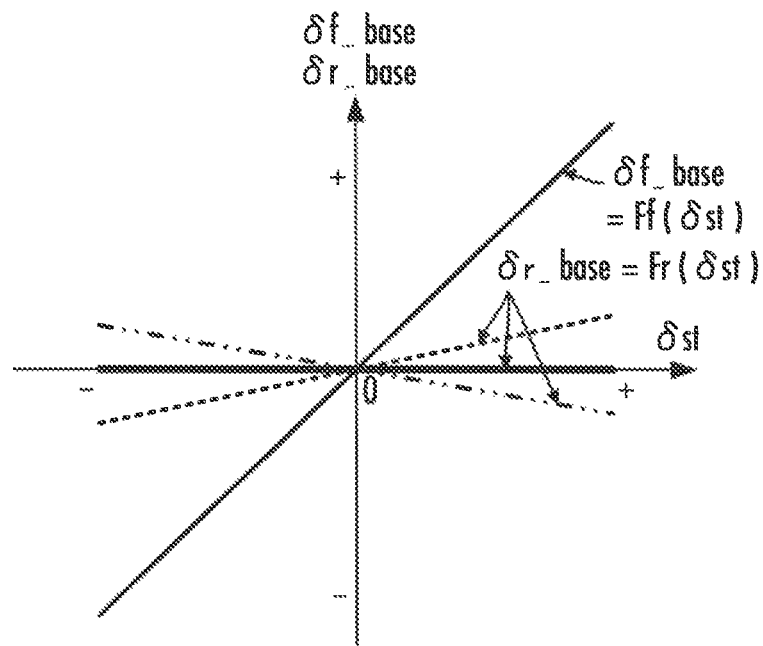
FIG. 10A and FIG. 10B are graphs illustrating the relationship between the rotational angle of a steering wheel and the reference values of the steering angles of a front wheel and a rear wheel.
Figure 10B:
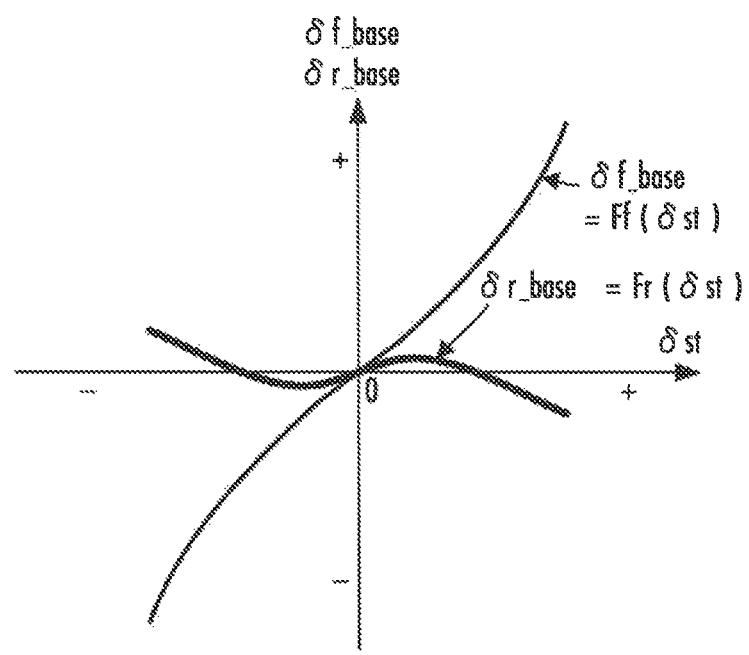

The example indicated by the solid line (the thick line) in the graph of FIG. 10A is an example in which the conversion function Fr is set such that the value of the δr_base is constantly maintained at zero, the example indicated by the dashed line in the graph is an example in which the conversion function Fr is set such that the value of the δr_base monotonically increases as the value of the δst increases, and the example indicated by the two-dot chain line of the graph is an example in which the conversion function Fr is set such that the value of the δr_base monotonically decreases as the value of the δst increases.

In every example, as described above, the difference between the value of δf_base and the value of δr_base monotonically increases as the value of the δst increases.

However, the form of change in the basic value δr_base of the rear wheel steering angle in response to a change in the value of the steering wheel angle δst is not limited to the form of the monotonous change. For example, as illustrated by the thick line in the graph of FIG. 10B, the conversion function Fr may be created such that a region in which the value of δr_base monotonically increases as the value of the steering wheel angle δst increases and a region in which the value of δr_base monotonically decreases as the value of the steering wheel angle δst increases will be both included. In this example, the difference between the value of δf_base and the value of δr_base monotonically increases as the value of δst increases.

The steering angle control arithmetic unit 75 further carries out the processing for determining, by a processing unit 75-3, a steering angle component δltr for generating a lateral travel of the vehicle 1 according to an observed value of the steering wheel angle δst_act. The steering angle component δltr is a component which is included in both the desired front wheel steering angle δf_cmd and the desired rear wheel steering angle δr_cmd when the steering wheel angle δst_act is changed. Hereinafter, the steering angle component δltr will be referred to as "the lateral travel steering angle component δltr." The lateral travel steering angle component δltr corresponds to the steering angle component in the present invention.

The lateral travel steering angle component δltr is determined by the processing unit 75-3 illustrated in FIG. 9. More specifically, a filtered value δst(LP), which is obtained by subjecting the steering wheel angle δst_act to the low-pass characteristic filtering, and a filtered value δsr(HP), which is obtained by subjecting the steering wheel angle δst_act to the high-pass characteristic filtering, are determined by processing sections 75-3-1 and 75-3-2, respectively. The expressions indicated in the processing sections 75-3-1 and 75-3-2 in FIG. 9 illustrate a transfer function denoting the low-pass characteristic filtering and a transfer function denoting the high-pass characteristic filtering, respectively.

Then, the lateral travel steering angle component δltr is calculated by adding a value obtained by multiplying the filtered value δst(LP) by a gain Kst1 of a predetermined value, and a value obtained by multiplying the filtered value δst(HP) by a gain Kst2 of a predetermined value. More specifically, δltr is calculated according to expression (6a) given below.

$$\delta ltr = Kst1 \cdot \delta st(LP) + Kst2 \cdot \delta st(HP) \tag{6a}$$

The gain Kst2 related to the high-pass filtered value δst(HP) is set to a polarity such that the value of Kst2·δst(HP) leads to a steering angle in a direction that causes the vehicle 1 to travel in a translational manner to the right when the steering wheel angle δst_act changes to the positive direction (the direction in which the vehicle 1 is turned to the left), and that the value of Kst2·δst(HP) leads to a steering angle in a direction that causes the vehicle 1 to travel in a translational manner to the left when the steering wheel angle δst_act changes to the negative direction (the direction in which the vehicle 1 is turned to the right). In the present embodiment, "Kst2<0" holds.

Further, the gain Kst1 related to the low-pass filtered value δst(LP) is set to a predetermined value set beforehand, e.g. zero. However, the value of the gain Kst1 can be also set variably according to the traveling speed Vox or the like.

If the value of the gain Kst1 is set constantly to zero, then the processing by the processing section 75-3-1 (the low-pass characteristic filtering) is unnecessary.

The lateral travel steering angle component δltr determined as described above takes a value based mainly on δst(HP) when the steering wheel angle δst_act is changed. Further, in a state in which the steering wheel angle δst_act is maintained to be constant or substantially constant, the lateral travel steering angle component δltr takes a value based mainly on δst(LP).

Subsequently, the steering angle control arithmetic unit 75 calculates the desired front wheel steering angle δf_cmd and the desired rear wheel steering angle δr_cmd according to expressions (6b) and (6c), respectively, which are given below. The arithmetic processing of expressions (6b) and (6c) is the processing carried out by processing units 75-4 and 75-5, respectively, in FIG. 9.

$$\delta f\_cmd = \delta f\_base + \delta ltr \tag{6b}$$

$$\delta r\_cmd = \delta r\_base + \delta ltr \tag{6c}$$

The desired front wheel steering angle δf_cmd and the desired rear wheel steering angle δr_cmd are determined as described above. If δr_base is set constantly to zero, then the processing units 75-2 and 75-5 are unnecessary, and δltr is determined directly as δr_cmd.

Figure 11A:
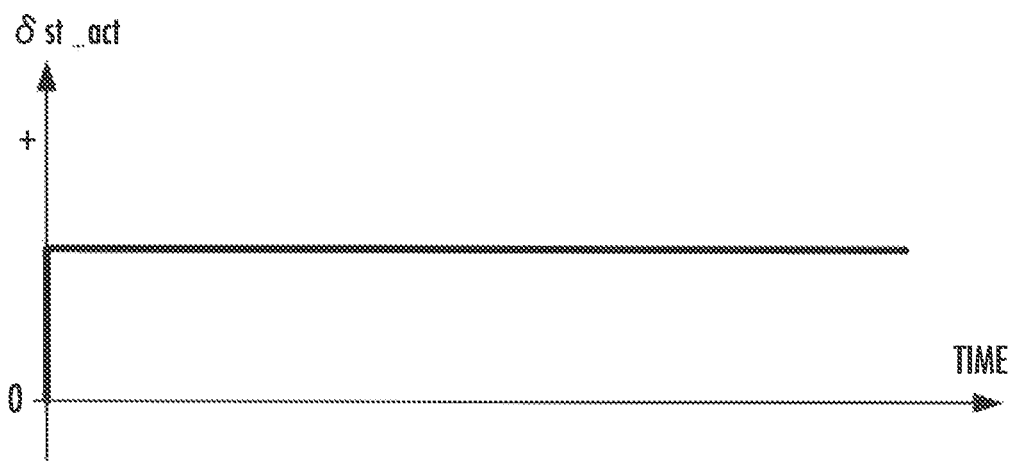
FIG. 11A is a graph illustrating an example of a time-dependent change in the rotational angle of the steering wheel.

Referring now to FIG. 11A, a case is assumed where the steering wheel angle δst_act is changed in steps and then is maintained to be constant. In this case, the lateral travel steering angle component δltr calculated according to expression (6a) described above switches to a polarity in the opposite direction from the change direction of the steering wheel angle δst_act according to the high-pass filtered value δst(HP) immediately after the steering wheel angle δst_act changes, as illustrated by curves a1 or a2 or a3 in the graph of FIG. 11B. In this case, the magnitude (an absolute value) of δltr increases and then changes to decrease with time. Thereafter, δltr converges to a value based on the low-pass filtered value δst(LP) (=Kst1·δst(LP)).

Figure 11B:
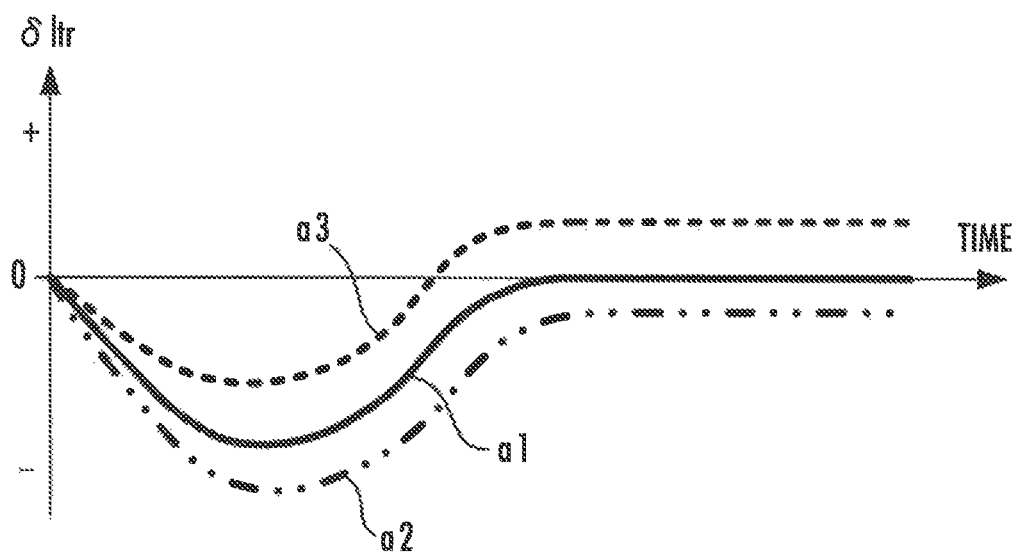
FIG. 11B is a graph illustrating a time-dependent change in a lateral travel steering angle component calculated on the basis of the time-dependent change in the rotational angle of the steering wheel illustrated in FIG. 11A.

In FIG. 11B, the solid line a1 illustrates an example in which the value of the gain Kst1 related to the low-pass filtered value δst(LP) is zero, the two-dot chain line a2 illustrates an example in which the value of the gain Kst1 is a negative value, and the dashed line a3 illustrates an example in which the value of the gain Kst1 is a positive value.

As described above, when the steering wheel angle δst_act is changed in steps, the lateral travel steering angle component δltr temporarily switches to the polarity in the opposite direction from the change direction of the steering wheel angle δst_act immediately after the steering wheel angle δst_act is changed, and then converges to a value based on a steady value after the change in the steering wheel angle δst_act.

For example, FIG. 11A shows that the steering wheel angle δst_act is changing in steps in the positive direction (the direction for turning the vehicle 1 to the left), so that the lateral travel steering angle component δltr temporarily switches to the negative direction (the direction for steering the front wheels 3f and the rear wheels 3r to the right) immediately after the change.

Further, if the value of the gain Kst1 related to the low-pass filtered value δst(LP) is set to zero, then the final steady value of the lateral travel steering angle component δltr will be zero. However, it is possible to set the final steady value of the lateral travel steering angle component δltr to a value that is shifted to the positive side or the negative side from zero by setting the value of the gain Kst1 to a positive value or a negative value.

Then, the values of the desired front wheel steering angle δf_cmd and the desired rear wheel steering angle δr_cmd will be determined by adding the lateral travel steering angle component δltr, which has the time-dependent change characteristic described above, to the basic values δf_base and δr_base, respectively, defined according to the steering wheel angle δst_act (the values obtained by correcting the basic values δf_base and δr_base by the lateral travel steering angle component δltr).

Supplementarily, if the polarity of the desired front wheel steering angle δf_cmd calculated according to expression (6b) is the opposite of the polarity of the basic value δf_base, then the desired front wheel steering angle δf_cmd may be limited to zero or a value close to zero.

The controller 60 controls the front wheel steering angle control actuator 35 and the rear wheel steering angle control actuator 44 according to the desired front wheel steering angle δf_cmd and the desired rear wheel steering angle δr_cmd determined as described above.

In this case, the front wheel steering angle control actuator 35 is servo-controlled such that the rotational angle of the pinion 28 on the front wheel 3f side reaches the desired rotational angle that will achieve the desired front wheel steering angle δf_cmd. Similarly, the rear wheel steering angle control actuator 44 is servo-controlled such that the rotational angle of the pinion 41 on the rear wheel 3r side reaches the desired rotational angle that will achieve the desired rear wheel steering angle δr_cmd.

The behavior of the vehicle 1 caused by the foregoing steering angle control of the front wheels 3f and the rear wheels 3r will be described with reference to FIG. 12.

Figure 12:
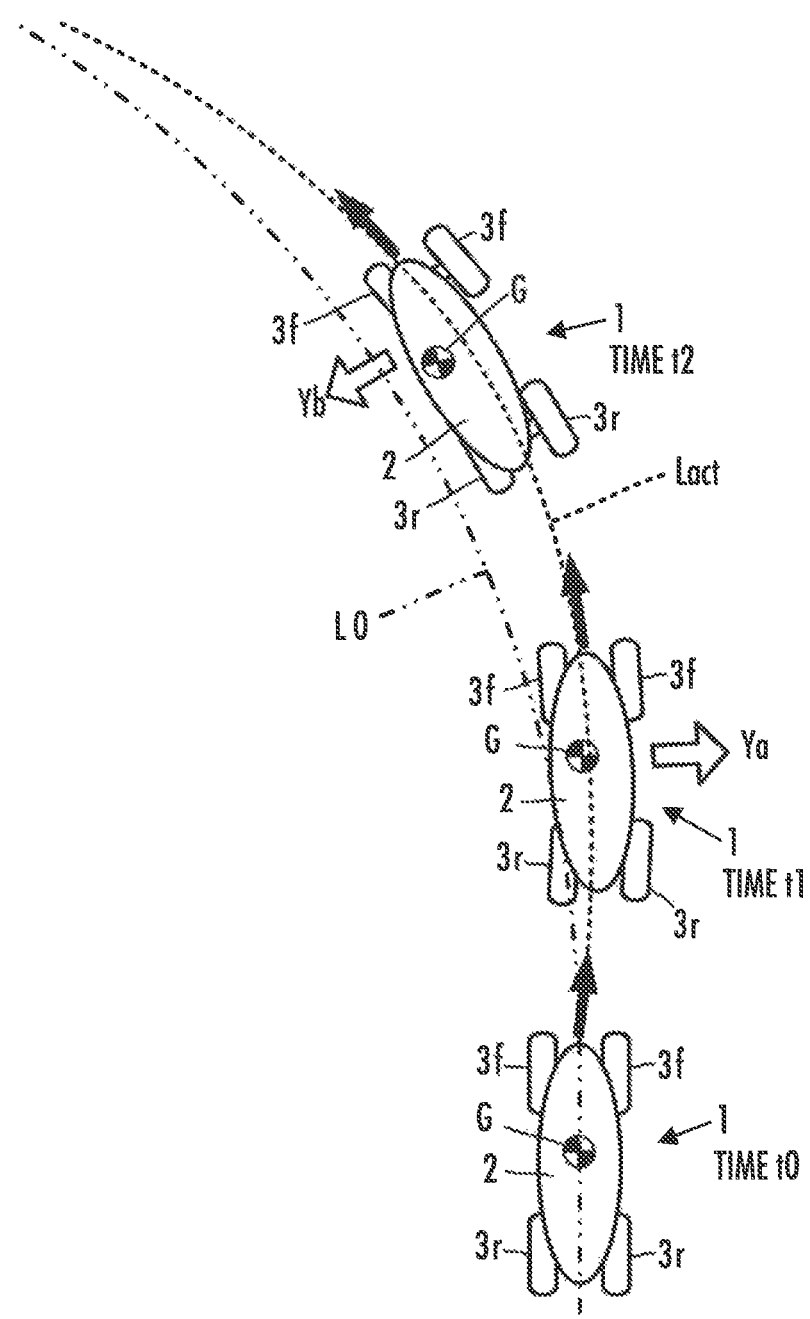
FIG. 12 is a diagram illustrating a behavior example of the vehicle.

FIG. 12 schematically illustrates the behavior of the vehicle 1 (more specifically, the behavior of a ground contact part of the vehicle 1) in the case where, for example, the driver of the vehicle 1 traveling in a straight line changes, at time t0, the steering angle δst_act to the positive direction in order to turn the vehicle 1 to the left.

In the present embodiment, as a representative example, the basic value δr_base of the rear wheel steering angle δr defined according to the steering wheel angle δst_act and the value of the gain Kst1 related to the low-pass filtered value δst(LP) are set to zero. Further, in FIG. 12, a two-dot chain line L0 schematically illustrates the travel path (the movement route of the ground contact part of the vehicle 1) observed when the front wheel steering angle δf_act and the rear wheel steering angle δr_act are matched to the basic values δf_base and δr_base, respectively, and a dashed line Lact schematically illustrates an actual travel path.

In this case, immediately after the steering wheel angle δst_act is changed, the steering angle δf_act of the front wheels 3f is controlled to a steering angle of a value that is smaller than the basic value δf_base (>0) defined according to the steering wheel angle δst_act by the absolute value of the lateral travel steering angle component δltr. At the same time, the steering angle δr_act of the rear wheels 3r is controlled to a steering angle of a negative value that is smaller than zero by the absolute value of the lateral travel steering angle component δltr.

Hence, immediately following a change in the steering wheel angle δst_act, a velocity component is generated in the ground contact part of the vehicle 1. The velocity component temporarily moves the ground contact part in the direction opposite from the turning center side (the left side in the illustrated example) due to the influence of the lateral travel steering angle component δltr, as indicated by a hollow arrow Ya. As a result, the ground contact part of the vehicle 1 temporarily travels along a travel path Lact, which curves outward relative to a travel path L0, as illustrated by the vehicle 1 at time t1.

After that, the lateral travel steering angle component δltr converges to zero (=Kst1·δst(LP)). Hence, the front wheel steering angle δf_act approaches the basic value δf_base (>0), and the rear wheel steering angle δr_act approaches zero, which is the basic value δr_base. This causes a velocity component to be generated at the ground contact part of the vehicle 1. The velocity component directs the vehicle 1 toward the turning center side (the left side in the illustrated example), as indicated by a hollow arrow Yb. As a result, the ground contact part of the vehicle 1 travels along the travel path Lact that approaches the travel path L0, as illustrated by the vehicle 1 at time t2.

Thus, when the turning of the vehicle 1 traveling in a straight line is begun, the ground contact part of the vehicle 1 will temporarily travel along the path that curves outward (to the opposite side from the turning center side) immediately after the turning is begun. Therefore, even when the body 2 is tilted to the turning center side, the inertial force acting on the body 2 and the driver toward the opposite side from the turning center side can be reduced by controlling the foregoing roll angle. This makes it possible to effectively prevent the inner wheels of the front wheels 3f, 3f and the rear wheels 3r, 3r of the vehicle 1 from being lifted up.

The advantageous effect described above is not limited to the case where the turning of the vehicle 1 traveling in a straight line is begun. For example, the same advantageous effect can be obtained in a case where the steering wheel angle δst_act is changed so as to change the turning radius of the vehicle 1 while the vehicle 1 is turning with the steering wheel angle δst_act maintained to be constant or substantially constant.

Second Embodiment

A description will be given of a second embodiment of the present invention with reference to FIG. 13 to FIG. 15. In the present embodiment, the same aspects as those of the first embodiment will not be described.

The present embodiment differs from the first embodiment only in a part of the processing by a controller 60. More specifically, according to the present embodiment, the amount of horizontal movement (the amount of movement in the Y-axis direction of the foregoing reference coordinate system) of the inverted pendulum mass point 81 described with reference to FIG. 7 will be used in place of the roll angle φb of the body 2 to control the attitude in the roll direction of the body 2 of the vehicle 1.

Figure 13:
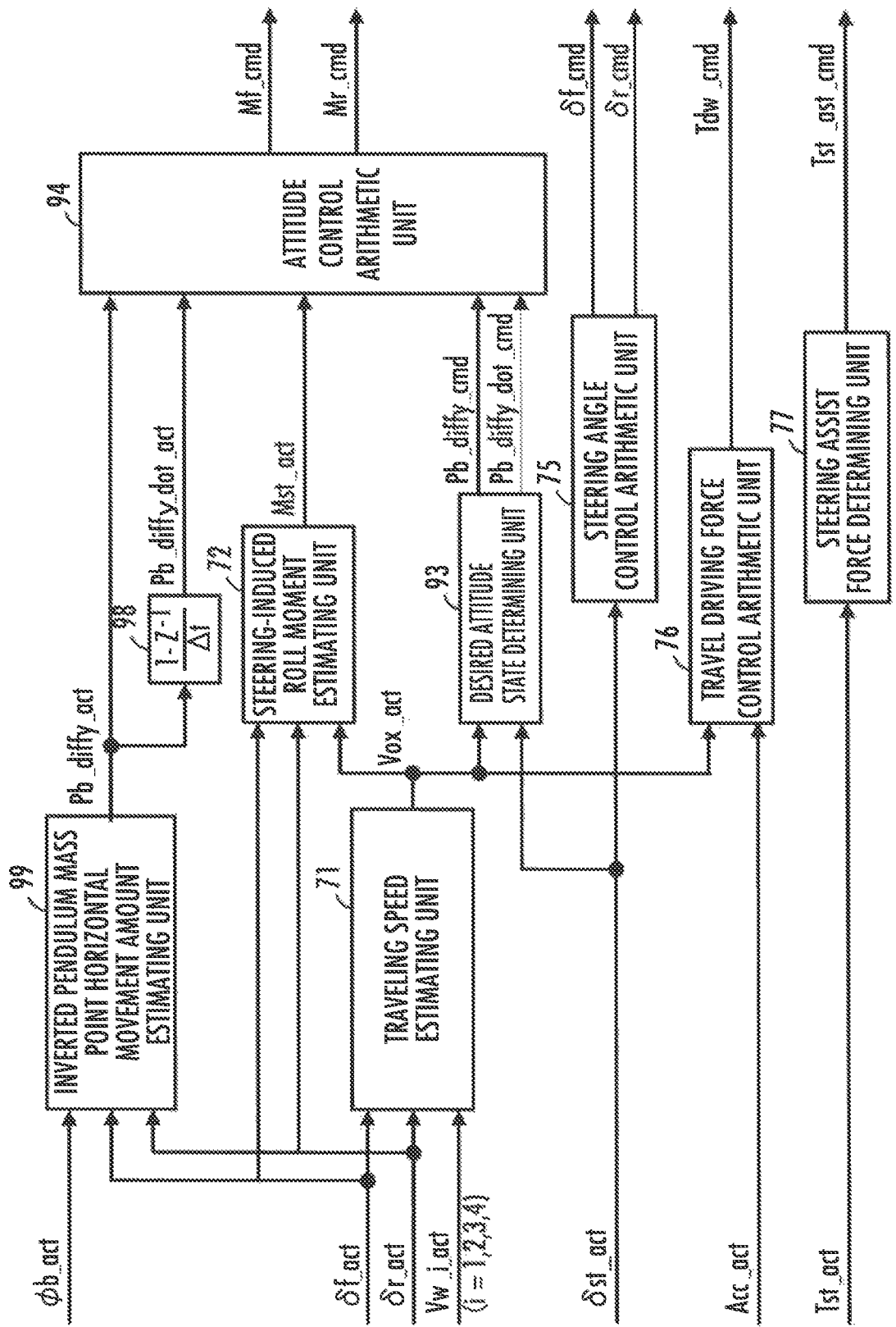
FIG. 13 is a block diagram illustrating the major functions of a controller in the second embodiment.

Thus, as illustrated in FIG. 13, the controller 60 according to the present embodiment is provided with an inverted pendulum mass point horizontal movement amount estimating unit 99, which estimates a horizontal movement amount Pb_diffy_act of the inverted pendulum mass point 81, and a differential arithmetic unit 98, which determines an inverted pendulum mass point horizontal velocity Pb_diffy_dot_act, which is the temporal change rate of the horizontal movement amount Pb_diffy_act (hereinafter referred to as "the inverted pendulum mass point horizontal movement amount Pb_diffy_act"), in place of the differential arithmetic unit 78 in the first embodiment.

Further, the controller 60 has, in place of the foregoing desired attitude state determining unit 73, a desired attitude state determining unit 93, which determines a desired inverted pendulum mass point horizontal movement amount Pb_diffy_cmd and a desired inverted pendulum mass point horizontal velocity Pb_diffy_dot_cmd, which denote the desired value of the inverted pendulum mass point horizontal movement amount Pb_diffy_act and the desired value of the inverted pendulum mass point horizontal velocity Pb_diffy_dot_act, respectively.

Further, an attitude control arithmetic unit 94 of the controller 60 according to the present embodiment determines a desired front roll moment Mf_cmd and a desired rear roll moment Mr_cmd by processing that differs from the processing in the first embodiment.

Figure 14:
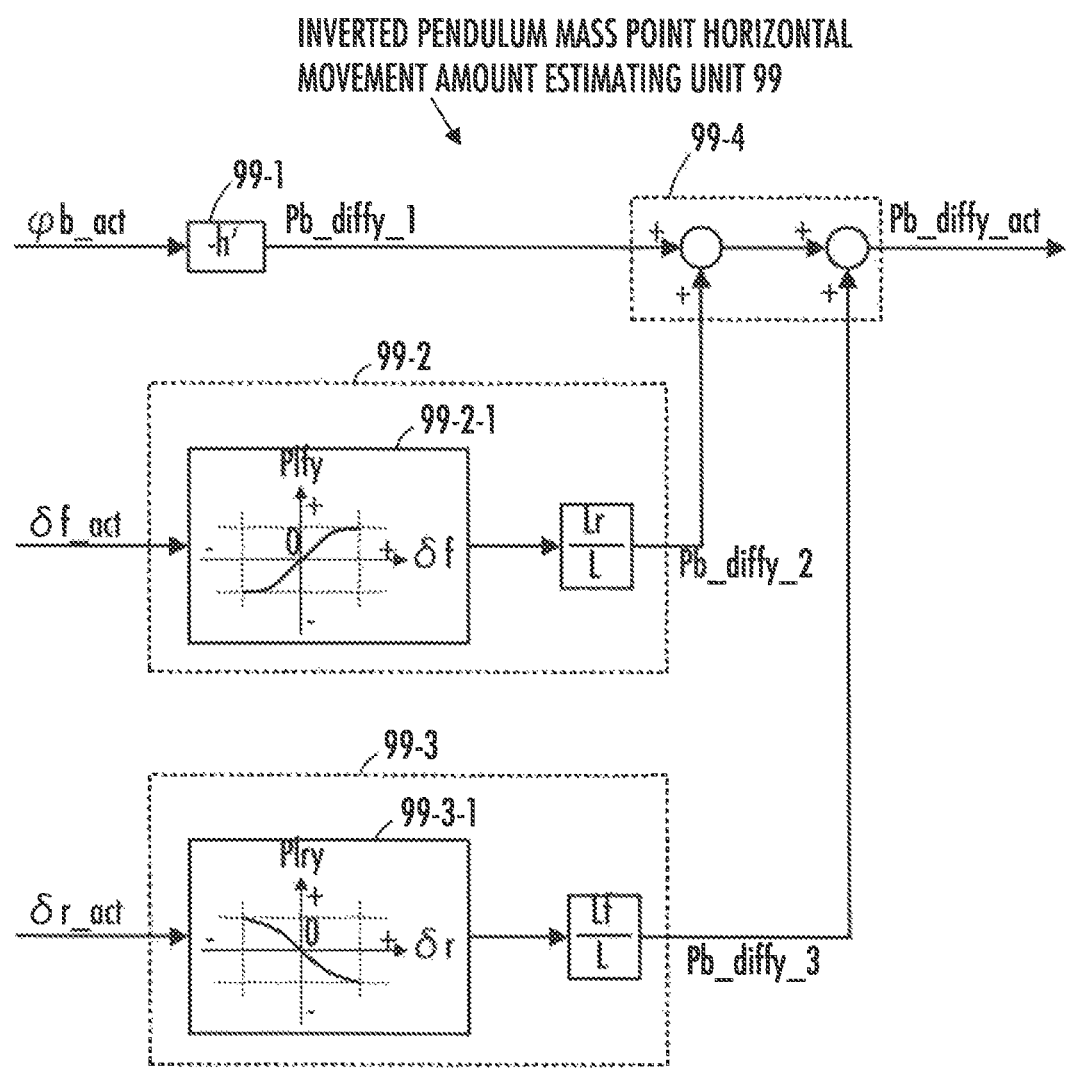
FIG. 14 is a block diagram illustrating the processing by an inverted pendulum mass point horizontal movement amount estimating unit illustrated in FIG. 13.

At each control processing cycle of the controller 60, the inverted pendulum mass point horizontal movement amount estimating unit 99 receives the observed values of a roll angle φb_act, a front wheel steering angle δf_act, and a rear wheel steering angle δr_act, as illustrated in FIG. 13 or FIG. 14. These observed values are the values indicated by the outputs (detection signals) of a body tilt detector 61, a front wheel steering angle detector 64, and a rear wheel steering angle detector 65.

Then, the inverted pendulum mass point horizontal movement amount estimating unit 99 uses the received values to determine the estimated value of the inverted pendulum mass point horizontal movement amount Pb_diffy_act by the arithmetic processing illustrated by the block diagram of FIG. 14.

More specifically, the inverted pendulum mass point horizontal movement amount estimating unit 99 calculates Pb_diffy_act by the arithmetic processing of expressions (7a) to (7d) given below.

$$Pb\_diffy\_1 = -h'^* \phi b\_act \tag{7a}$$

$$Pb\_diffy\_2 = Plfy(\delta f\_act) \cdot (Lr/L) \tag{7b}$$

$$Pb\_diffy\_3 = Plry(\delta r\_act) \cdot (Lf/L) \tag{7c}$$

$$Pb\_diffy\_act = Pb\_diffy\_1 + Pb\_diffy\_2 + Pb\_diffy\_3 \tag{7d}$$

Referring to FIG. 14, processing units 99-1, 99-2, 99-3, and 99-4 are the processing units that carry out the arithmetic processing of expressions (7a), (7b), (7c), and (7d), respectively. Reference characters L, Lf, Lr, and h' are the same as the reference characters described in relation to the foregoing expression (1c) or (1f).

In the processing unit 99-1, Pb_diffy_1 calculated according to expression (7a) denotes a component in Pb_diffy_act, which component is defined according to the roll angle φb_act. In the arithmetic processing of expression (7a), sin(φb_act) is approximately equal to φb_act (sin(φb_act)≈φb_act).

Further, in the processing section 99-2, Pb_diffy_2 calculated according to expression (7b) denotes a component in Pb_diffy_act, which component is defined according to the front wheel steering angle δf_act. The Pb_diffy_2 corresponds to the estimated value of the movement amount in the Y-axis direction of the on-the-ground-contact surface mass point 82 based on the steering of the front wheels 3f.

Further, Plfy(δf_act) in expression (7b) denotes a function value determined by a conversion function Plfy(δf) prepared in advance from the value of δf_act in the processing section 99-2-1 in FIG. 14. The conversion function Plfy(δf) is composed of, for example, a map or an arithmetic equation. The conversion function Plfy(δf) according to the present embodiment is prepared such that the value of Plfy monotonically increases from a negative value to a positive value as the value of δf increases (increases from a negative value to a positive value), as illustrated in the diagram of the processing section 99-2-1.

Further, in the processing unit 99-3, Pb_diffy_3 calculated according to expression (7c) denotes a component in Pb_diffy_act, which component is defined according to the rear wheel steering angle δr_act. Pb_diffy_3 corresponds to the estimated value of the movement amount in the Y-axis direction of the on-the-ground-contact surface mass point 82 based on the steering of the rear wheels 3r.

Further, Plry(δr_act) in expression (7c) denotes the function value determined by a conversion function Plry(δr) prepared in advance from the value of δr_act in the processing section 99-3-1 in FIG. 14. The conversion function Plry(δr) is composed of, for example, a map or an arithmetic equation. The conversion function Plry(δr) according to the present embodiment is prepared such that the value of Plry monotonically decreases from a positive value to a negative value as the value of δr increases (increases from a negative value to a positive value), as illustrated in the diagram of the processing section 99-3-1.

Then, based on Pb_diffy_1, Pb_diffy_2, and Pb_diffy_3 calculated according to expressions (7a), (7b), and (7c), respectively, the estimated value of the inverted pendulum mass point horizontal movement amount Pb_diffy_act is calculated by the arithmetic processing (according to expression (7d)) by the processing section 99-4.

As described above, the inverted pendulum mass point horizontal movement amount estimating unit 99 carries out the arithmetic processing of expressions (7a) to (7d) given above thereby to calculate the estimated value of the inverted pendulum mass point horizontal movement amount Pb_diffy_act.

Supplementarily, in the processing section 99-2-1, the conversion function of the processing section 99-2-1 may be set to determine the value of Plfy($\delta$f_act)·(Lr/L). In this case, an output value of the processing section 99-2-1 will be directly calculated as Pb_diffy_2.

Similarly, in the processing section 99-3-1, the conversion function of the processing section 99-3-1 may be set to determine the value of Plry($\delta$r_act)·(Lf/L). In this case, an output value of the processing section 99-3-1 will be directly calculated as Pb_diffy_3.

Returning to FIG. 13, a desired attitude state determining unit 93 receives an observed value of a steering wheel angle $\delta$st_act and an estimated value of a traveling speed Vox_act, as with the first embodiment.

Then, based on the received values, the desired attitude state determining unit 93 determines a desired inverted pendulum mass point horizontal movement amount Pb_diffy_cmd and a desired inverted pendulum mass point horizontal velocity Pb_diffy_dot_cmd by predetermined arithmetic processing.

According to the present embodiment, the desired attitude state determining unit 93 sets the desired inverted pendulum mass point horizontal velocity Pb_diffy_dot_cmd to zero. Further, the desired attitude state determining unit 93 determines the desired inverted pendulum mass point horizontal movement amount Pb_diffy_cmd according to expression (4b) given below on the basis of a desired roll angle $\phi$b_cmd calculated according to the foregoing expression (4a) described in relation to the processing by the desired attitude state determining unit 73 in the first embodiment.

$$Pb\_diffy\_cmd = -h'^* \phi b\_cmd \quad (4b)$$

Thus, Pb_diffy_cmd is determined such that the roll moment acting on a body 2 due to the centrifugal force acting on the overall center of gravity G of a vehicle 1 and the roll moment acting on the body 2 due to the gravity acting on the overall center of gravity G of the vehicle 1 are balanced out when the body 2 is tilted at the desired roll angle $\phi$b_cmd corresponding to Pb_diffy_cmd.

Supplementarily, the desired inverted pendulum mass point horizontal movement amount Pb_diffy_cmd may be directly determined from an observed value of the steering wheel angle $\delta$st_act and an estimated value of the traveling speed Vox_act by using a map prepared in advance.

Alternatively, a value obtained by multiplying the value calculated by the calculation of the right side of expression (4b) by a positive coefficient set to a value below one may be determined as the desired inverted pendulum mass point horizontal movement amount Pb_diffy_cmd.

Further, the desired inverted pendulum mass point horizontal velocity Pb_diffy_dot_cmd can be set to a value other than zero during a transient period or the like in the middle of a change in a steering wheel angle $\delta$st_act or a front wheel steering angle $\delta$f_act or a rear wheel steering angle $\delta$r_act.

Figure 15:
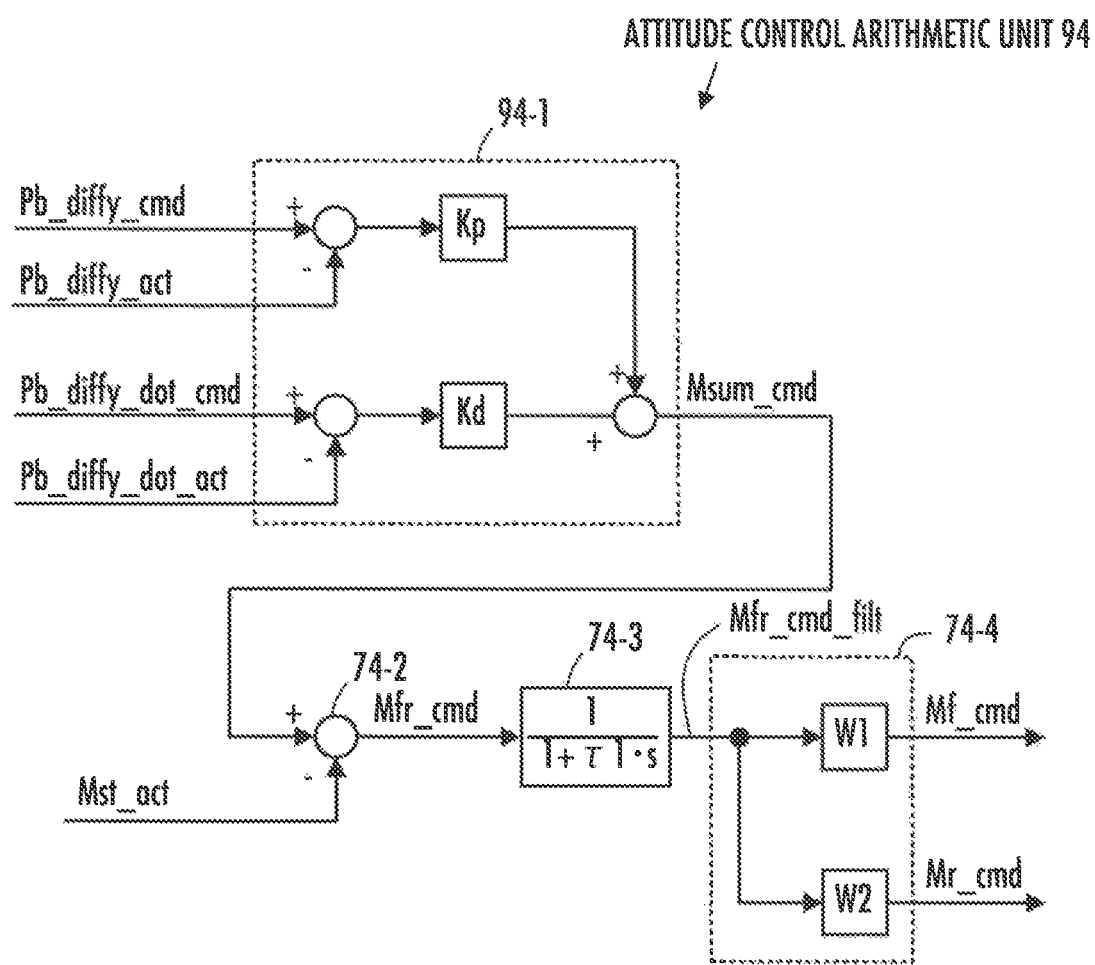
FIG. 15 is a block diagram illustrating the processing by an attitude control arithmetic unit illustrated in FIG. 13.

An attitude control arithmetic unit 94 receives an inverted pendulum mass point horizontal movement amount Pb_diffy_act determined by the inverted pendulum mass point horizontal movement amount estimating unit 99 as described above and the inverted pendulum mass point horizontal velocity Pb_diffy_dot_act calculated as a differential value of the inverted pendulum mass point horizontal movement amount Pb_diffy_act by a differential arithmetic unit 98 in place of the roll angle $\phi$b_act and the roll angular velocity $\phi$b_dot_act, as illustrated in FIG. 13 or FIG. 15. Further, in place of the desired roll angle $\phi$b_cmd and the desired roll angular velocity $\phi$b_dot_cmd, the desired inverted pendulum mass point horizontal movement amount Pb_diffy_cmd and the desired inverted pendulum mass point horizontal velocity Pb_diffy_dot_cmd determined by the desired attitude state determining unit 93 as described above are supplied to the attitude control arithmetic unit 94.

The attitude control arithmetic unit 94 further receives an estimated value of a steering-induced roll moment Mst_act calculated by a steering-induced roll moment estimating unit 72, as with the foregoing first embodiment.

Then, the attitude control arithmetic unit 94 uses the foregoing input values to determine the combination of the desired front roll moment Mf_cmd and the desired rear roll moment Mr_cmd by the arithmetic processing illustrated by the block diagram of FIG. 15.

In this case, only the processing of determining a desired value of a total roll moment Msum_cmd to be applied to the body 2 (the processing by the processing unit 94-1 in FIG. 15) differs from the first embodiment, and the remaining processing (the processing by the processing units 74-2, 74-3, and 74-4) is the same as the processing in the first embodiment.

The processing unit 94-1 calculates Msum_cmd according to expression (8a) given below. More specifically, Msum_cmd is calculated according to a proportional plus derivative control law (PD control law), which is an example of a feedback control law, such that the inverted pendulum mass point horizontal movement amount Pb_diffy_act is converged to the desired inverted pendulum mass point horizontal movement amount Pb_diffy_cmd.

$$Msum\_cmd = Kp \cdot (Pb\_diffy\_cmd - Pb\_diffy\_act) + Kd \cdot (Pb\_diffy\_dot\_cmd - Pb\_diffy\_dot\_act) \quad (8a)$$

In expression (8a), Kp and Kd denote gains of predetermined values.

A desired Mfr_cmd obtained by subtracting the steering-induced roll moment Mst_act from Msum_cmd determined as described above is divided into the desired front roll moment Mf_cmd and the desired rear roll moment Mr_cmd, as with the first embodiment.

The present embodiment is the same as the first embodiment except for the aspects described above.

The present embodiment can also provide the same advantageous effect as that of the first embodiment.

Third Embodiment

Figure 17:
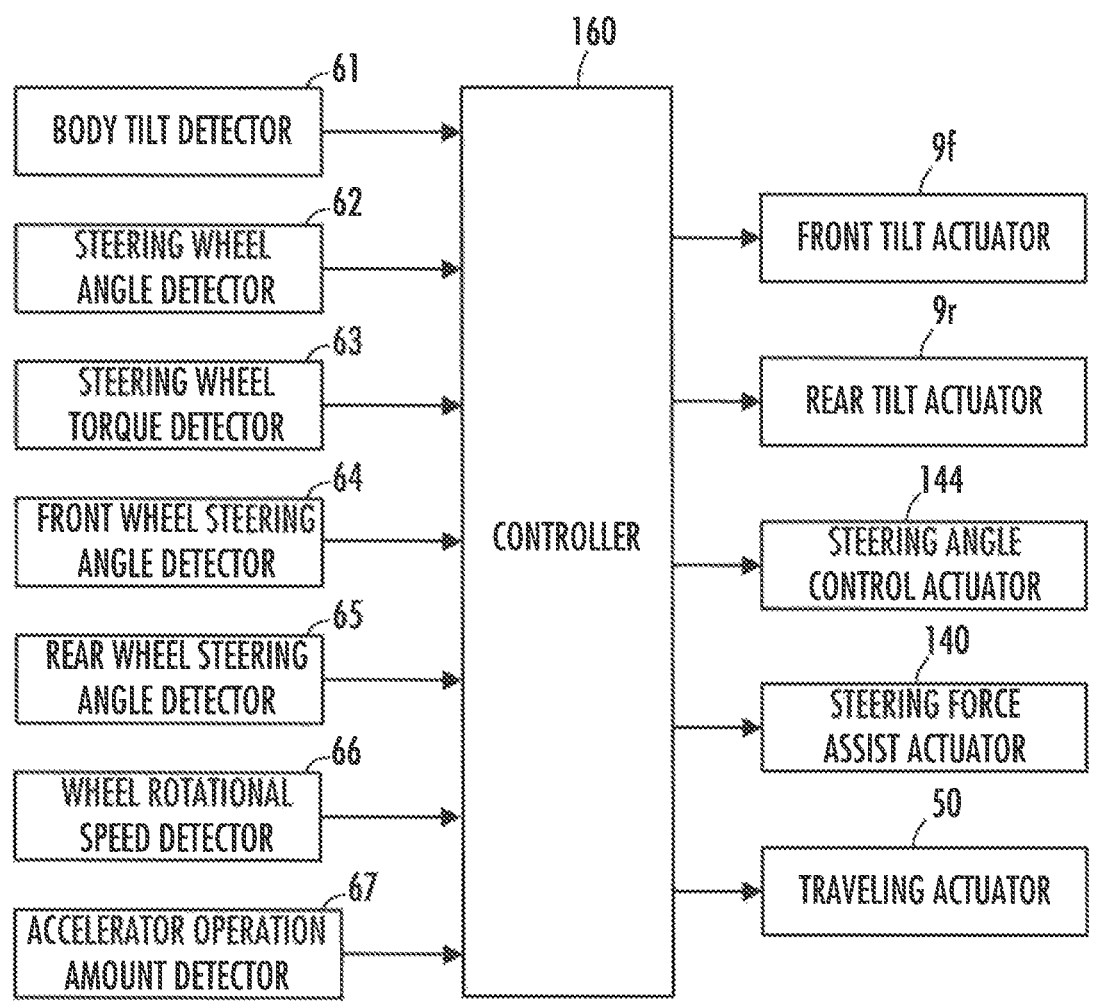
FIG. 17 is a block diagram illustrating the configuration related to the control of the vehicle according to the third embodiment.
Figure 18:
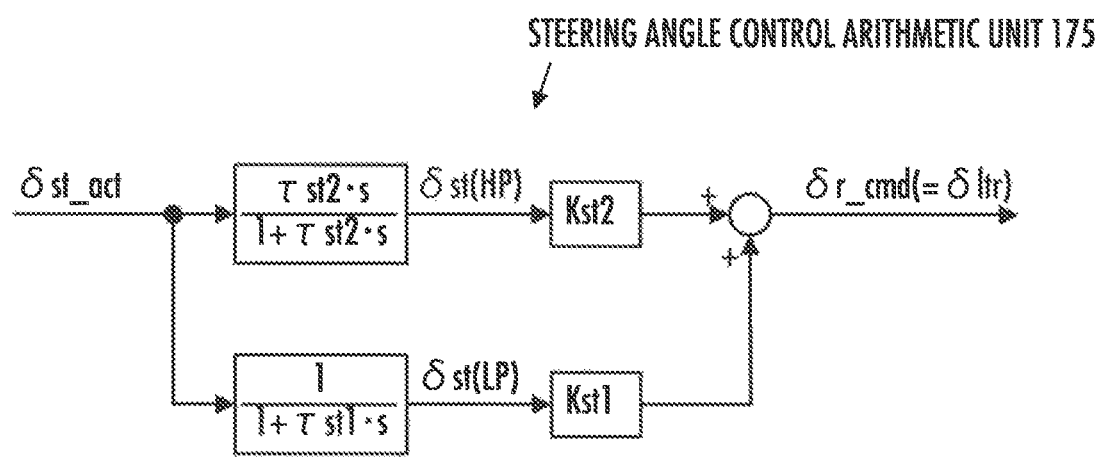
FIG. 18 is a block diagram illustrating the processing by a steering angle control arithmetic unit provided in the controller illustrated in FIG. 17.

A description will now be given of a third embodiment of the present invention with reference to FIG. 16 to FIG. 18. In the present embodiment, the description of the same aspects as those of the first embodiment or the second embodiment will be omitted.

Figure 16:
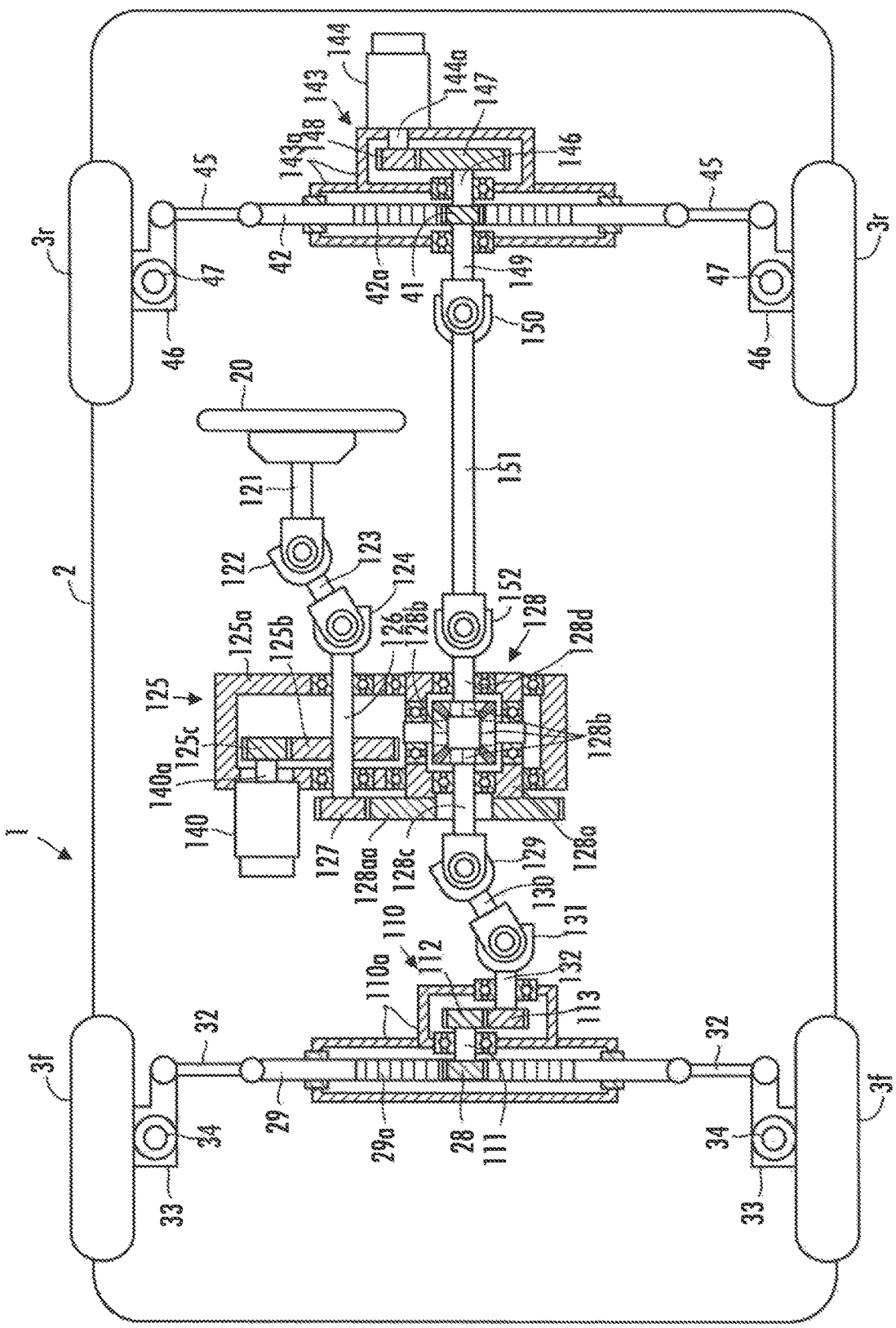
FIG. 16 is a diagram illustrating a steering mechanism of a vehicle according to a third embodiment.

Referring to FIG. 16, a vehicle 1 of the present embodiment differs from that of the first embodiment in the steering mechanism. The steering mechanism is configured to be capable of steering front wheels 3f according to the rotational operation of a wheel 20 and also configured such that the steering angles of the front wheels 3f mechanically change as the steering angles of rear wheels 3r are changed by a steering angle control actuator 144.

To be more specific, the steering mechanism for the front wheels 3f has a gear box 110 including a pinion 28 and a rack bar 29, which are similar to those in the first embodiment, a rotation transmission mechanism, which transmits the rotation of the wheel 20 to the pinion 28, and a steering force assist actuator 140, which generates a steering assist force for assisting the rotational operation of the wheel 20. The steering force assist actuator 140 is composed of, for example, an electric motor.

The gear box 110 further has a gear 112 coaxially connected with the pinion 28 through a rotating shaft 111, and a gear 113 meshed with the gear 112, in addition to the pinion 28 and the rack bar 29 in a chassis 110a.

According to the present embodiment, the rotation transmission mechanism, which transmits the rotation from the wheel 20 to the pinion 28, is configured to transmit the rotation of the wheel 20 to the pinion 28 through a first rotating shaft 121, which is the rotating shaft of the wheel 20, a second rotating shaft 123 connected to the first rotating shaft 121 through a universal joint 122, a gear box 125 including a third rotating shaft 126 connected to the second rotating shaft 123 through a universal joint 124, a fourth rotating shaft 130 connected through a universal joint 129 to a first output shaft 128c of a differential gear mechanism 128 incorporated in the gear box 125, a fifth rotating shaft 132 connected to the fourth rotating shaft 130 through a universal joint 131, and gears 113, 112 and a rotating shaft 111 in the gear box 110 in this order.

The third rotating shaft 126 passes through a chassis 125a of the gear box 125 such that the third rotating shaft 126 is rotatable about the axis thereof. Further, a gear 127 is coaxially connected to an end of the third rotating shaft 126 projecting out of the chassis 125a (the end being on the opposite side from the universal joint 124).

The differential gear mechanism 128 has an outer case 128a, which includes four bevel gears 128b. The outer case 128a is installed to the chassis 125a of the gear box 125 such that the outer case 128a is rotatable, at the side of the third rotating shaft 126, about an axis parallel to the third rotating shaft 126. Further, a gear 128aa fixed to the outer case 128a is meshed with the gear 127 adjacent to the third rotating shaft 126.

Further, the first output shaft 128c is coaxially extended from one of two bevel gears 128b, 128b that share the same rotational axis as that of the outer case 128a among the four bevel gears 128b in the outer case 128a, and a second output shaft 128d is coaxially extended from the other bevel gear 128b.

The fifth rotating shaft 132 has the distal end thereof inserted in the chassis 110a of the gear box 110 and is coaxially connected to the gear 113 such that the fifth rotating shaft 132 is rotatable integrally with the gear 113 in the chassis 110a.

Thus, when the wheel 20 is rotated, the pinion 28 can be rotated (and therefore the front wheels 3f, 3f can be steered through the intermediary of the rack bar 29).

Further accommodated in the chassis 125a of the gear box 125, in which the differential gear mechanism 128 is incorporated, are a gear 125b, which is attached to the third rotating shaft 126 such that the gear 125b is rotatable integrally with the third rotating shaft 126, and a gear 125c meshed with the gear 125b. In addition, the steering force assist actuator 140 is attached to the chassis 125a.

Further, an output shaft 140a (rotary drive shaft) of the steering force assist actuator 140 is inserted in the chassis 125a and coaxially connected to the gear 125c such that the output shaft 140a is rotatable integrally with the gear 125c in the chassis 125a.

Therefore, the steering assist force can be imparted to the third rotating shaft 126 from the steering force assist actuator 140 through the gears 125c and 125b.

The steering mechanism for the rear wheels 3r has a gear box 143 including a pinion 41 and a rack bar 42, which are similar to those in the first embodiment, and the steering angle control actuator 144. The steering angle control actuator 144 is composed of, for example, an electric motor.

A chassis 143a of the gear box 143 accommodates a gear 147, which is coaxially connected to the pinion 41 through a rotating shaft 146, and a gear 148 meshed with the gear 147. The steering angle control actuator 144 is installed to the chassis 143a. In the present embodiment, the steering angle control actuator 144 corresponds to the steering actuator in the present invention. An output shaft 144a (rotary drive shaft) of the steering angle control actuator 144 is inserted in the chassis 143a and coaxially connected to the gear 148 such that the output shaft 144a is rotatable integrally with the gear 148 in the chassis 143a.

Further, a rotating shaft 149 coaxially extended, from the pinion 41, on the opposite side from the rotating shaft 146 is projected toward the front from the chassis 143a of the gear box 143. Further, the rotating shaft 149 is connected to a second output shaft 128d of the foregoing differential gear mechanism 128 through the intermediary of a universal joint 150, a propeller shaft 151, and a universal joint 152.

Thus, servo-controlling the steering angle control actuator 144 makes it possible to control the rotational angle of the pinion 41 (i.e. the movement amount of the rack bar 42) and thereby to control the steering angles δr_act of the rear wheels 3r, 3r. In the present embodiment, a reference value δr_base of the rear wheel steering angle δr_act (reference steering angle) is zero.

At the same time, as the pinion 41 rotates, the rotation of the second output shaft 128d of the differential gear mechanism 128 is servo-controlled. Hence, the differential gear mechanism 128 functions to cause the front wheel steering angle δf_act to change from a steering angle based on a steering wheel angle δst_act (the value of a front wheel steering angle δf when a rear wheel steering angle δr is zero) by the same amount as the rear wheel steering angle δr_act. In this case, the value of the front wheel steering angle δf based on the steering wheel angle δst_act corresponds to the reference value δf_base (reference steering angle) described in the foregoing first embodiment.

According to the present embodiment, the steering mechanism of the vehicle 1 is configured as described above. Supplementarily, each of the steering force assist actuator 140 and the steering angle control actuator 144 may be composed of an actuator other than an electric motor, e.g. a hydraulic actuator. In addition, each of the steering force assist actuator 140 and the steering angle control actuator 144 may alternatively be a direct acting type actuator rather than being limited to the rotary type actuator.

Further, the steering force assist actuator 140 may alternatively be configured to impart the steering assist force to an element other than the third rotating shaft 126 in the rotation transmission mechanism to the pinion 28 from the wheel 20. Further alternatively, as with the first embodiment, the steering assist force may be imparted to the rack bar 29.

Further, the steering mechanism adjacent to the front wheels 3f may be configured without a device for generating the steering assist force, such as the foregoing steering force assist actuator 140.

Further, the differential gear mechanism 128 may be replaced by a differential mechanism having a different structure (e.g. a planetary gear mechanism or a differential mechanism using links).

The mechanical configuration of the vehicle 1 according to the present embodiment is the same as that of the first embodiment except for the aspects described above.

A description will now be given of the control processing in the present embodiment. As illustrated in FIG. 17, a controller 160 according to the present embodiment receives the outputs (detection signals) of detectors 61 to 67, as described in the first embodiment. The controller 160 is composed of one or more electronic circuit units, as with the first embodiment.

Further, the controller 160 controls a front tilt actuator 9f, a rear tilt actuator 9r, a steering angle control actuator 144, a steering force assist actuator 140, and a traveling actuator 50 by functions implemented by the configuration of installed hardware or programs (software configuration).

In this case, the control processing of the front tilt actuator 9f, the rear tilt actuator 9r, the steering force assist actuator 140, and the traveling actuator 50 is the same as that in the first embodiment or the second embodiment.

Meanwhile, the control processing of the steering angle control actuator 144 differs from that in the first embodiment and the second embodiment. More specifically, the controller 160 according to the present embodiment has a steering angle control arithmetic unit 175, which performs the arithmetic processing illustrated in the block diagram of FIG. 18 instead of the steering angle control arithmetic unit 75 described in the first embodiment.

The observed value of the steering wheel angle δst_act is input to the steering angle control arithmetic unit 175. Then, the steering angle control arithmetic unit 175 carries out the same processing as that carried out by the processing unit 75-3 of the steering angle control arithmetic unit 75 in the first embodiment so as to determine a desired rear wheel steering angle δr_cmd. In other words, the steering angle control arithmetic unit 175 determines the lateral travel steering angle component δltr, which has been described in the first embodiment, directly as the desired rear wheel steering angle δr_cmd.

The controller 160 controls the steering angle control actuator 144 according to the desired rear wheel steering angle δr_cmd (=δltr). The control method is the same as the control method of the rear wheel steering angle control actuator 44 in the first embodiment.

The control processing by the controller 160 is the same as that in the first embodiment or the second embodiment except for the aspects described above.

According to the present embodiment described above, when the vehicle 1 turns, the rear wheel steering angle δr_act is controlled to coincide with the lateral travel steering angle component δltr as the desired rear wheel steering angle δr_cmd. At this time, the front wheel steering angle δf_act is adjusted to a steering angle that is shifted by δltr from a reference value based on the steering wheel angle δst_act.

Thus, the same advantageous effect as that of the first embodiment can be obtained for the behavior of the vehicle 1 when turning.

[Modifications]

The following will describe several modifications of the embodiment described above. For each embodiment, the mechanism for tilting the body 2 adopts the type of mechanism illustrated in FIG. 1A and FIG. 1B. However, the mechanism may be a different type of mechanism.

For example, as the mechanism for tilting the body 2, the mechanism illustrated in FIG. 19A to FIG. 19C may be adopted. The mechanism has parallel link mechanisms 180, which share the same structures and which are located at the front and the rear of the body 2.

Paired upper and lower horizontal links 181 and 182 of the front parallel link mechanism 180 are connected to a front arm 7f extendedly provided downward from the body 2 through support shafts 185 and 186, respectively, which have axes in the longitudinal direction of the body 2, and are also journaled so as to be relatively rotatable about the axes of the support shafts 185 and 186 with respect to the front arm 7f.

Further, front wheels 3f, 3f are steerably supported about steering axes by a pair of left and right vertical links 183 and 184 of the front parallel link mechanism 180.

Similarly, paired upper and lower horizontal links 181 and 182 of the rear parallel link mechanism 180 are connected to the rear arm 7r extendedly provided downward from the body 2 through support shafts 185 and 186, respectively, which have axes in the longitudinal direction of the body 2, and are also journaled so as to be relatively rotatable about the axes of the support shafts 185 and 186 with respect to the rear arm 7r.

Further, rear wheels 3r, 3r are steerably supported about steering axes by a pair of left and right vertical links 183 and 184 of the rear parallel link mechanism 180.

The steering axis of each of the front wheels 3f is adapted to tilt in the roll direction as the vertical link 183 or 184 supporting the front wheel 3f tilts in the roll direction. The same applies to the rear wheels 3r.

In the vehicle 1, the front or the rear parallel link mechanism 180 deforms, causing the body 2 to tilt in the roll direction, as illustrated in FIG. 19B or FIG. 19C. In this case, the front wheels 3f and the rear wheels 3r also tilt in the roll direction.

Further, as a mechanism that causes the body 2 to tilt, a mechanism illustrated in, for example, FIG. 20A and FIG. 20B, may be adopted. This mechanism has a pair of links 190 and 191, which share the same configuration, on the front side and the rear side, respectively, of the vehicle 1. The links 190 and 191 extend approximately in a vertical direction.

Further, the upper ends of the links 190 and 191 on the front side are connected to the body 2 through support shafts 190a and 191a, which have axes in the longitudinal direction, and are also journaled so as to be relatively rotatable with respect to the body 2 about the axes of the support shafts 190a and 191a. Further, the lower ends of the links 190 and 191 on the front side are connected to a member 192 fixed to the upper surface of a front horizontal frame 6f through support shafts 190b and 191b, which have axes in the longitudinal direction, and are also journaled so as to be relatively rotatable with respect to the member 192 about the axes of the support shafts 190b and 191b.

The upper ends of the links 190 and 191 on the rear side are connected to the body 2, as with the links 190 and 191 on the front side, and the lower ends thereof are connected to the member 192 fixed to the upper surface of a rear horizontal frame 6r, as with the links 190 and 191 on the front side.

According to the vehicle 1, the links 190 and 191 on the front side and the rear side swing with respect to the horizontal frames 6*f* and 6*r*, respectively, thereby causing the body 2 to tilt in the roll direction, as illustrated in FIG. 20B.

Further, as a mechanism that causes the body 2 to tilt, the mechanism illustrated in, for example, FIG. 21A and FIG. 21B can be adopted. The mechanism is provided with arc-like guide rails 200 on the front side and the rear side of the vehicle 1, the guide rails 200 being formed to have the same curvature and extending in the roll direction.

The guide rail 200 on the front side is supported on support struts 201 vertically provided on the front horizontal frame 6*f*, and the guide rail 200 on the rear side is supported on support struts 201 vertically provided on the rear horizontal frame 6*r*.

Further, a plurality of rollers 202, which is journaled on the body 2 such that the rollers 202 are rotatable about the axes in the longitudinal direction, is engaged on each of the guide rails 200 such that the rollers 202 are rollable along the guide rails 200. In the illustrated example, two rollers 202 each are engaged on the upper surface side and the lower surface side of each of the guide rails 200.

According to the vehicle 1, the rollers 202 engaged on each of the guide rails 200 on the front side and the rear side roll along the guide rail 200 thereby to cause the body 2 to tilt in the roll direction, as illustrated in FIG. 21B.

As described above, the mechanism that causes the body 2 to tilt is available in a variety of forms.

Further, in the first to the third embodiments described above, 8*f* and 8*r*, which provide the tilt center of the body 2, are disposed at positions that are substantially the same heights as the heights of the axle center lines (rotation axes) of the front wheels 3*f* and the rear wheels 3*r*.

Figure 22A:
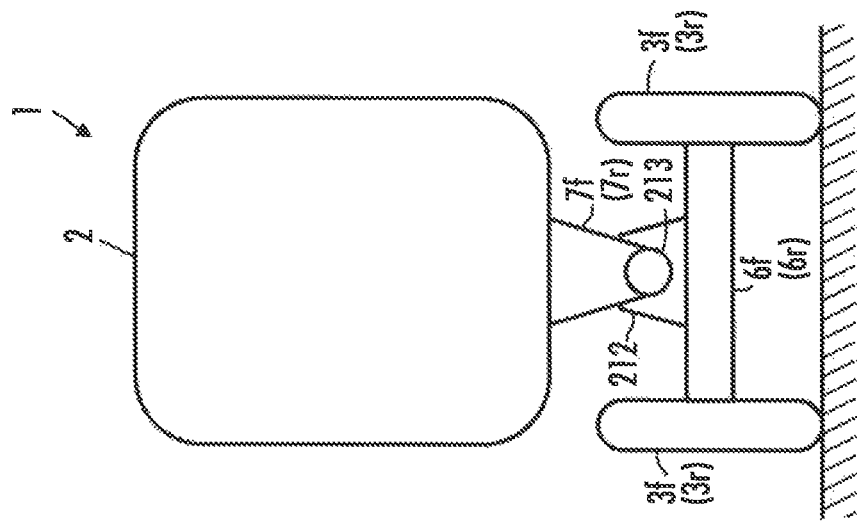
FIG. 22A and FIG. 22B are diagrams illustrating a fifth example and a sixth example of the tilt mechanism of the vehicle body.
Figure 22B:
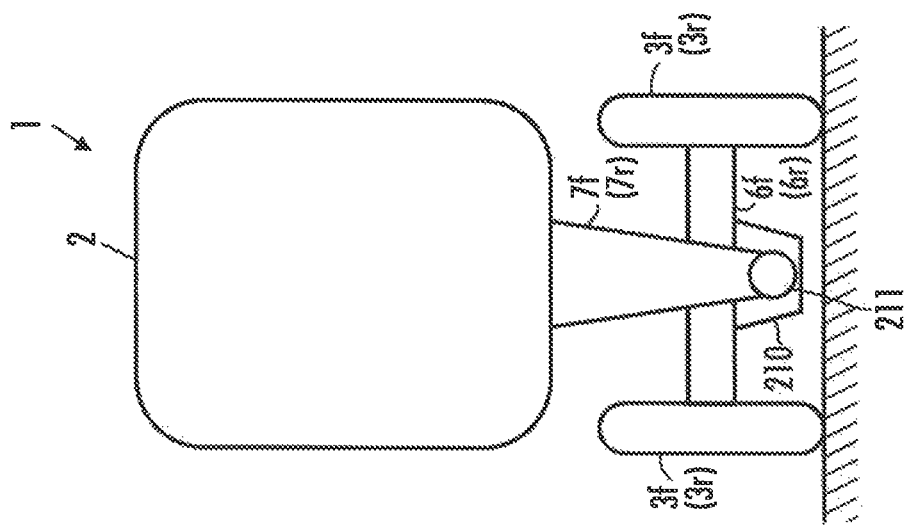

Alternatively, however, the tilt center of the body 2 may be disposed at a position that is lower than the axle center lines of the front wheels 3*f* and the rear wheels 3*r* as illustrated in FIG. 22A or may be disposed at a position that is higher than the axle center lines of the front wheels 3*f* and the rear wheels 3*r* as illustrated in FIG. 22B.

In this case, according to the example illustrated in FIG. 22A, a support shaft 211 providing the tilt center of the body 2 is installed to a member 210 protrusively provided on the lower surface of each of the horizontal frames 6*f* and 6*r*. According to the example illustrated in FIG. 22B, a support shaft 213 providing the tilt center of the body 2 is installed to a member 212 protrusively provided on the upper surface of each of the horizontal frames 6*f* and 6*r*.

In the vehicle 1 illustrated in each of FIG. 19A, FIG. 20A, and FIG. 21A, the tilt center of the body 2 is positioned to be lower than the axle center lines of the front wheels 3*f* and the rear wheels 3*r*.

Further, the vehicle 1 illustrated in each embodiment described above is a four-wheeled vehicle provided with two each of the front wheels 3*f* and the rear wheels 3*r*. However, the vehicle 1 may alternatively be a three-wheeled vehicle having, for example, a single front wheel 3*f* or a single rear wheel 3*r*.

Further, the embodiments described above have illustrated the vehicle 1 adapted to generate the steering assist force by the steering force assist actuator 36 or 140. Alternatively, however, the vehicle 1 may be a vehicle that does not include a device that generates the steering assist force. For example, the vehicle 1 may be the vehicle that omits the steering force assist actuator 36 and the pinion 31 illustrated in FIG. 3, or a vehicle that omits the steering force assist actuator 140 and the gears 125*b* and 125*c* illustrated in FIG. 16.

Further, the embodiments described above have illustrated the vehicle provided with the tilt actuators 9*f* and 9*r* on the front side and the rear side, respectively, of the vehicle 1. Alternatively, however, only one tilt actuator may be used. Further alternatively, three or more tilt actuators may be mounted in the vehicle.

Further, in the embodiments described above, the control processing by the controller 60 or 160 is not limited to the control processing described above. For example, the lateral travel steering angle component δltr in the control of the front wheel steering angle δf_act and the rear wheel steering angle δr_act may be set to be slightly different between the front wheels 3*f* and the rear wheels 3*r*.

Further alternatively, the lateral travel steering angle component δltr corresponding to the front wheels 3*f* and the rear wheels 3*r* may be determined such that the lateral travel steering angle component δltr corresponding to the front wheels 3*f* and the lateral travel steering angle component δltr corresponding to the rear wheels 3*r* will be in direct proportion to each other (such that δltr corresponding to one of the front wheels 3*f* and the rear wheels 3*r* will take a value obtained by multiplying δltr corresponding to the other by a positive coefficient). For example, the lateral travel steering angle component δltr corresponding to the rear wheels 3*r* may be determined as with the foregoing embodiments, and a value obtained by multiplying the determined value of δltr by a coefficient of a predetermined value may be determined as the lateral travel steering angle component corresponding to the front wheels 3*f*.

Further, it is also possible to control the roll angle of the body 2 or the steering angles of the front wheels or the rear wheels while predicting a future behavior of the vehicle 1 by using a technique, such as the receding horizon control.

What is claimed is:

1. A vehicle comprising:
   a vehicle body which has a driver boarding section;
   a front wheel and a rear wheel, which are disposed with an interval provided therebetween in a longitudinal direction of the vehicle body;
   a steering wheel which can be operated by a driver;
   a tilt actuator which tilts the vehicle body in a roll direction; and
   a controller which has a function for controlling the tilt actuator to tilt the vehicle body according to at least an operation of the steering wheel,
   at least one of the front wheel and the rear wheel being composed of a plurality of wheels arranged in parallel in a vehicle width direction,
   wherein the front wheel and the rear wheel are provided such that the front wheel and the rear wheel can be steered by a steering mechanism including one or more steering actuators which can be controlled by the controller,
   the controller is configured to control the steering actuator or actuators, in a case where the steering wheel is operated in a turning direction of the vehicle from a straight line traveling state of the vehicle, so as to change a steering angle of the front wheel toward a steering angle specified according to an operation amount observed after the steering wheel is operated, and also to change a steering angle of the rear wheel to an opposite direction of the turning direction of the vehicle immediately after the steering wheel is operated, and the controller is configured to control the steering actuator or actuators such that the steering angle of each of the front wheel and the rear wheel becomes a steering angle which is obtained by adding a steering angle component determined according to the operation of the steering wheel to a reference steering angle of each of the front wheel and the rear wheel specified according to the operation amount of the steering wheel, and also configured to determine the steering angle component such that the steering angle component becomes a component in an opposite direction of the turning direction of the vehicle and that a magnitude of the steering angle component increases and then decreases, immediately after the steering wheel is operated.

2. The vehicle according to claim 1,
wherein the controller is configured to control the steering actuator or actuators and also to control the tilt actuator to tilt the vehicle body toward a center of turning of the vehicle in the case where the steering wheel is operated in the turning direction of the vehicle from the straight line traveling state of the vehicle.

3. The vehicle according to claim 1,
wherein the controller is configured to determine the steering angle component corresponding to the front wheel and the steering angle component corresponding to the rear wheel to have values which agree with each other or which are in directly proportional relation.

4. The vehicle according to claim 1,
wherein the controller is configured to determine the steering angle component according to a value obtained by carrying out high-pass characteristic filtering on the operation amount of the steering wheel, immediately after at least the steering wheel is operated.

5. The vehicle according to claim 1,
wherein the controller is configured to determine, in a case where the operation amount after the steering wheel is operated converges to a prescribed value, the steering angle component such that the steering angle component corresponding to each of the front wheel and the rear wheel converges to a value of the steering angle component specified according to the operation amount of the prescribed value of the steering wheel or converges to zero after the magnitude of the steering angle component decreases.

6. A vehicle comprising:
a vehicle body which has a driver boarding section;
a front wheel and a rear wheel, which are disposed with an interval provided therebetween in a longitudinal direction of the vehicle body;
a steering wheel which can be operated by a driver;
a tilt actuator which tilts the vehicle body in a roll direction; and
a controller which has a function for controlling the tilt actuator to tilt the vehicle body according to at least an operation of the steering wheel,
at least one of the front wheel and the rear wheel being composed of a plurality of wheels arranged in parallel in a vehicle width direction,
wherein the front wheel and the rear wheel are provided such that the front wheel and the rear wheel can be steered by a steering mechanism including one or more steering actuators which can be controlled by the controller, the controller is configured to control the steering actuator or actuators, in a case where the steering wheel is operated to increase an operation amount of the steering wheel from a prescribed operation amount while the vehicle is in a turning state, so as to change a steering angle of the front wheel toward a steering angle specified according to an operation amount observed after the steering wheel is operated, and also to change a steering angle of the rear wheel to an opposite direction of a turning direction of the vehicle immediately after the steering wheel is operated, and the controller is configured to control the steering actuator or actuators such that the steering angle of each of the front wheel and the rear wheel becomes a steering angle which is obtained by adding a steering angle component determined according to the operation of the steering wheel to a reference steering angle of each of the front wheel and the rear wheel specified according to the operation amount of the steering wheel, and also configured to determine the steering angle component such that the steering angle component becomes a component in an opposite direction of the turning direction of the vehicle and that a magnitude of the steering angle component increases and then decreases, immediately after the steering wheel is operated.

7. The vehicle according to claim 6,
wherein the controller is configured to control the steering actuator or actuators and also to control the tilt actuator to further tilt the vehicle body toward a center of turning of the vehicle in the case where the steering wheel is operated to increase the operation amount of the steering wheel from a prescribed operation amount in the turning state of the vehicle.

8. The vehicle according to claim 6,
wherein the controller is configured to determine the steering angle component corresponding to the front wheel and the steering angle component corresponding to the rear wheel to have values which agree with each other or which are in directly proportional relation.

9. The vehicle according to claim 6,
wherein the controller is configured to determine the steering angle component according to a value obtained by carrying out high-pass characteristic filtering on the operation amount of the steering wheel, immediately after at least the steering wheel is operated.

10. The vehicle according to claim 6,
wherein the controller is configured to determine, in a case where the operation amount after the steering wheel is operated converges to a prescribed value, the steering angle component such that the steering angle component corresponding to each of the front wheel and the rear wheel converges to a value of the steering angle component specified according to the operation amount of the prescribed value of the steering wheel or converges to zero after the magnitude of the steering angle component decreases.

* * * * *